United States Patent
Masuda et al.

(10) Patent No.: US 10,812,705 B2
(45) Date of Patent: Oct. 20, 2020

(54) IMAGING APPARATUS, IMAGING METHOD, AND IMAGING PROGRAM

(71) Applicant: FUJIFILM Corporation, Tokyo (JP)

(72) Inventors: Tomonori Masuda, Saitama (JP); Fuminori Irie, Saitama (JP); Yoshinori Furuta, Saitama (JP); Hitoshi Sakurabu, Saitama (JP); Hidekazu Kurahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/577,590

(22) Filed: Sep. 20, 2019

(65) Prior Publication Data

US 2020/0014859 A1    Jan. 9, 2020

Related U.S. Application Data

(63) Continuation of application No. PCT/JP2018/006042, filed on Feb. 20, 2018.

(30) Foreign Application Priority Data

Mar. 22, 2017  (JP) ................................ 2017-056327

(51) Int. Cl.
*H04N 5/232* (2006.01)
*H04N 5/235* (2006.01)

(52) U.S. Cl.
CPC ..... *H04N 5/232127* (2018.08); *H04N 5/2353* (2013.01); *H04N 5/23245* (2013.01); *H04N 5/232122* (2018.08)

(58) Field of Classification Search
CPC ......... H04N 5/232122; H04N 5/23245; H04N 5/232939; H04N 5/2353; H04N 5/353; H04N 5/37452

(Continued)

(56) References Cited

U.S. PATENT DOCUMENTS

2013/0258156 A1* 10/2013 Okuno ................... H04N 5/359
348/308

FOREIGN PATENT DOCUMENTS

JP          6-78205 A     3/1994
JP       2012-175331 A    9/2012

(Continued)

OTHER PUBLICATIONS

International Preliminary Report on Patentability and Written Opinion of the International Searching Authority(Forms PCT/IB/326, PCT/IB/373 and PCT/ISA/237), dated Oct. 3, 2019, for International Application No. PCT/JP2018/006042, with an English Translation.

(Continued)

*Primary Examiner* — Jamie J Atala
*Assistant Examiner* — Kathleen V Nguyen
(74) *Attorney, Agent, or Firm* — Birch, Stewart, Kolasch & Birch, LLP

(57) ABSTRACT

An imaging apparatus includes: an imager as defined herein; an imaging controller as defined herein; and a display controller as defined herein, the imaging controller performs, as the rolling readout drive, a first rolling readout drive as defined herein, the display controller performs a start instruction of the drawing update process to the display device, prior to a start timing of the first rolling readout drive based on the start timing, and a drawing update timing, at which the start instruction is performed, is a timing that the update timing of the image drawn in the display pixel row corresponding to the specific one of the pixel rows in the drawing update process started by the start instruction becomes a timing after a predetermined time from the start timing of the first rolling readout drive is elapsed.

23 Claims, 17 Drawing Sheets

(58) Field of Classification Search
USPC .......................................................... 348/140
See application file for complete search history.

(56) References Cited

FOREIGN PATENT DOCUMENTS

| | | | |
|---|---|---|---|
| JP | 2013-211649 A | | 10/2013 |
| JP | 2015-073241 | * | 4/2015 |
| JP | 2015-073241 A | | 4/2015 |
| JP | WO 2015/132957 | * | 9/2015 |
| WO | WO 2015/132957 A1 | | 9/2015 |

OTHER PUBLICATIONS

International Search Report (Form PCT/ISA/210), dated May 15, 2018, for International Application No. PCT/JP2018/006042, with an English translation.

* cited by examiner

IMAGING APPARATUS, IMAGING METHOD, AND IMAGING PROGRAM

CROSS REFERENCE TO RELATED APPLICATION

This is a continuation of International Application No. PCT/JP2018/006042 filed on Feb. 20, 2018, and claims priority from Japanese Patent Application No. 2017-056327 filed on Mar. 22, 2017, the entire disclosures of which are incorporated herein by reference.

BACKGROUND OF THE INVENTION

1. Field of the Invention

The present invention relates to an imaging apparatus, an imaging method, and a computer readable medium storing an imaging program.

2. Description of the Related Art

Recently, there has been a rapid increase in the demand for information devices having imaging functions such as electronic endoscopes, digital still cameras, digital video cameras, or mobile phones equipped with cameras, in accordance with an increase in resolution of imaging elements such as charge coupled device (CCD) image sensors and complementary metal oxide semiconductor (CMOS) image sensors. It should be noted that information devices having the above-mentioned imaging functions are referred to as imaging apparatuses.

In the MOS type imaging element, there is an imaging element provided with two-dimensionally arranged pixels, of which the pixels including a photoelectric conversion elements, an electric charge holding unit for holding electric charge generated and accumulated in the photoelectric conversion elements, and a reading circuit reads out a pixel signal corresponding to the electric charge held in the electric charge holding unit to signal lines. Such an imaging element can perform global shutter drive and rolling shutter drive.

In the global shutter drive, the photoelectric conversion elements of all the pixels are simultaneously reset to start exposure simultaneously in all the pixels, then electric charges accumulated in the photoelectric conversion elements of each pixel are simultaneously transferred to the electric charge holding unit of each pixel, to finish exposure simultaneously in all the pixels, and thereafter, the electric charges accumulated in the electric charge holding unit are sequentially converted into pixel signals for each pixel row and read out to the signal lines.

The rolling shutter drive is a method that resetting photoelectric conversion elements of a pixel row to start exposure of the pixel row, then transferring electric charges accumulated in the photoelectric conversion elements of the pixel row to the electric charge holding unit to finish the exposure, and sequentially performing driving for read out the pixel signal corresponding to the electric charge held in the electric charge holding unit to the signal line, while changing the pixel row.

In the global shutter drive, the timing of start and end of exposure can be made simultaneously for all pixels. Therefore, distortion during imaging of a moving subject, which is a problem in rolling shutter drive, does not occur, and high-quality imaging can be performed on a moving subject.

JP1994-078205A (JP-H06-078205A) describes an imaging apparatus which drives an imaging element by a global shutter method at the time of imaging for storing a still image. In this imaging apparatus, by sequentially reading out pixel signals from center position of an imaging surface of the imaging element toward periphery of the imaging surface, it is possible to store the image of the main subject even in a case where the power is turned off during imaging.

SUMMARY OF THE INVENTION

In the global shutter drive, while a pixel is being exposed, a captured image obtained by the exposure cannot be displayed. The captured image is sequentially displayed from the upper end side to the lower end side of the display surface of the display device after the end of the exposure. However, a subject at which a user is focusing may not necessarily be located at the top of the display surface. Therefore, it may take time until the subject, the user wants to confirm, is displayed on the display surface, and in this case, the possibility of losing the subject is increased.

JP1994-078205A (JP-H06-078205A) describes that a captured image signal obtained by driving of the global shutter method is stored in a storage medium, and the captured image signal stored in the storage medium is reproduced. However, a case of reproducing the captured image signal in real time during the imaging process, is not assumed.

The present invention has been made in view of the above-mentioned situations, and an object of the present invention is to provide an imaging apparatus, an imaging method, and an imaging program capable of rapidly displaying a portion necessary for a user among captured image signals obtained by performing imaging by driving of the global shutter method, to reduce a risk of losing a subject.

According to an embodiment of the present invention, there is provided an imaging apparatus comprising: an imager that has a plurality of pixels including a photoelectric conversion element and an electric charge holder which holds an electric charge transferred from the photoelectric conversion element and from which a pixel signal corresponding to the electric charge is read out by a reading circuit, and has an imaging surface in which a plurality of pixel rows consisting of the plurality of pixels arranged in a row direction is arranged in a column direction orthogonal to the row direction; an imaging controller that performs a global reset drive for starting exposure of the plurality of pixels by simultaneously resetting the photoelectric conversion elements of the plurality of pixels, a global shutter drive for finishing the exposure by simultaneously transferring the electric charge accumulated in the photoelectric conversion element of each of the plurality of pixels by the exposure to the electric charge holder, and a rolling readout drive for sequentially reading out, for each of the pixel rows, a pixel signal corresponding to the electric charge held in the electric charge holder by the global shutter drive; and a display controller that displays a live view image generated based on the pixel signal output from the pixel of the imager by the rolling readout drive, on a display device that has a display surface on which a plurality of display pixel rows each consisting of a plurality of display pixels arranged in one direction is arranged in an orthogonal direction which is orthogonal to the one direction and performs a drawing update process for sequentially updating an image drawn in the display pixel row from the display pixel row at one end of the display surface in the orthogonal direction to the other end in the orthogonal direction, wherein the imaging controller performs, as the rolling readout drive, a first rolling readout drive for performing readout of the pixel signals in order from a specific one of the pixel rows between the pixel rows at both ends of the column direction of the imaging surface to the pixel row at one end in the column direction of the imaging surface and performing readout of the pixel signals in order from the pixel row at other end in the column direction of the imaging surface to the specific one of the pixel rows after reading out the pixel signal from the pixel row at the one end, wherein the display controller performs a start instruction of the drawing update process to the display device, prior to a start timing of the first rolling readout drive based on the start timing, and wherein a drawing update timing, at which the start instruction is performed, is a timing that the update timing of the image drawn in the display pixel row corresponding to the specific one of the pixel rows in the drawing update process started by the start instruction becomes a timing after a predetermined time from the start timing of the first rolling readout drive is elapsed.

According to an embodiment of the present invention, there is provided an imaging method using an imager that has a plurality of pixels including a photoelectric conversion element and an electric charge holder which holds an electric charge transferred from the photoelectric conversion element and from which a pixel signal corresponding to the electric charge is read out by a reading circuit, and has an imaging surface in which a plurality of pixel rows consisting of the plurality of pixels arranged in a row direction is arranged in a column direction orthogonal to the row direction, the method comprising: an imaging control step for performing a global reset drive for starting exposure of the plurality of pixels by simultaneously resetting the photoelectric conversion elements of the plurality of pixels, a global shutter drive for finishing the exposure by simultaneously transferring the electric charge accumulated in the photoelectric conversion element of each of the plurality of pixels by the exposure to the electric charge holder, and a rolling readout drive for sequentially reading out, for each of the pixel rows, a pixel signal corresponding to the electric charge held in the electric charge holder by the global shutter drive; and a display control step for displaying a live view image generated based on the pixel signal output from the pixel of the imager by the rolling readout drive, on a display device that has a display surface on which a plurality of display pixel rows each consisting of a plurality of display pixels arranged in one direction is arranged in an orthogonal direction which is orthogonal to the one direction and performs a drawing update process for sequentially updating an image drawn in the display pixel row from the display pixel row at one end of the display surface in the orthogonal direction to the other end in the orthogonal direction, wherein in the imaging control step, as the rolling readout drive, a first rolling readout drive for performing readout of the pixel signals in order from a specific one of the pixel rows between the pixel rows at both ends of the column direction of the imaging surface to the pixel row at one end in the column direction of the imaging surface and performing readout of the pixel signals in order from the pixel row at other end in the column direction of the imaging surface to the specific one of the pixel rows after reading out the pixel signal from the pixel row at the one end, is performed, wherein in the display control step, a start instruction of the drawing update process for the display device, is performed prior to a start timing of the first rolling readout drive based on the start timing, and wherein a drawing update timing, at which the start instruction is performed, is a timing that the update timing of the image drawn in the display pixel row corresponding to the specific one of the pixel rows in the drawing update process started by the start instruction becomes a timing after a predetermined time from the start timing of the first rolling readout drive is elapsed.

According to an embodiment of the present invention, there is provided an imaging program that causes a computer to realize an imaging method using an imager that has a plurality of pixels including a photoelectric conversion element and an electric charge holder which holds an electric charge transferred from the photoelectric conversion element and from which a pixel signal corresponding to the electric charge is read out by a reading circuit, and has an imaging surface in which a plurality of pixel rows consisting of the plurality of pixels arranged in a row direction is arranged in a column direction orthogonal to the row direction, the imaging method comprising: an imaging control step for performing a global reset drive for starting exposure of the plurality of pixels by simultaneously resetting the photoelectric conversion elements of the plurality of pixels, a global shutter drive for finishing the exposure by simultaneously transferring the electric charge accumulated in the photoelectric conversion element of each of the plurality of pixels by the exposure to the electric charge holder, and a rolling readout drive for sequentially reading out, for each of the pixel rows, a pixel signal corresponding to the electric charge held in the electric charge holder by the global shutter drive; and a display control step for displaying a live view image generated based on the pixel signal output from the pixel of the imager by the rolling readout drive, on a display device that has a display surface on which a plurality of display pixel rows each consisting of a plurality of display pixels arranged in one direction is arranged in an orthogonal direction which is orthogonal to the one direction and performs a drawing update process for sequentially updating an image drawn in the display pixel row from the display pixel row at one end of the display surface in the orthogonal direction to the other end in the orthogonal direction, wherein in the imaging control step, as the rolling readout drive, a first rolling readout drive for performing readout of the pixel signals in order from a specific one of the pixel rows between the pixel rows at both ends of the column direction of the imaging surface to the pixel row at one end in the column direction of the imaging surface and performing readout of the pixel signals in order from the pixel row at other end in the column direction of the imaging surface to the specific one of the pixel rows after reading out the pixel signal from the pixel row at the one end, is performed, wherein in the display control step, a start instruction of the drawing update process for the display device, is performed prior to a start timing of the first rolling readout drive based on the start timing, and wherein a drawing update timing, at which the start instruction is performed, is a timing that the update timing of the image drawn in the display pixel row corresponding to the specific one of the pixel rows in the drawing update process started by the start instruction becomes a timing after a predetermined time from the start timing of the first rolling readout drive is elapsed.

According to the present invention, it is possible to provide an imaging apparatus, an imaging method, and an imaging program capable of rapidly displaying a portion necessary for a user among captured image signals obtained by performing imaging by driving of the global shutter method, to reduce a risk of losing a subject.

DESCRIPTION OF THE PREFERRED EMBODIMENTS

Hereinafter, embodiments of the present invention will be described with reference to the drawings.

Figure 1:
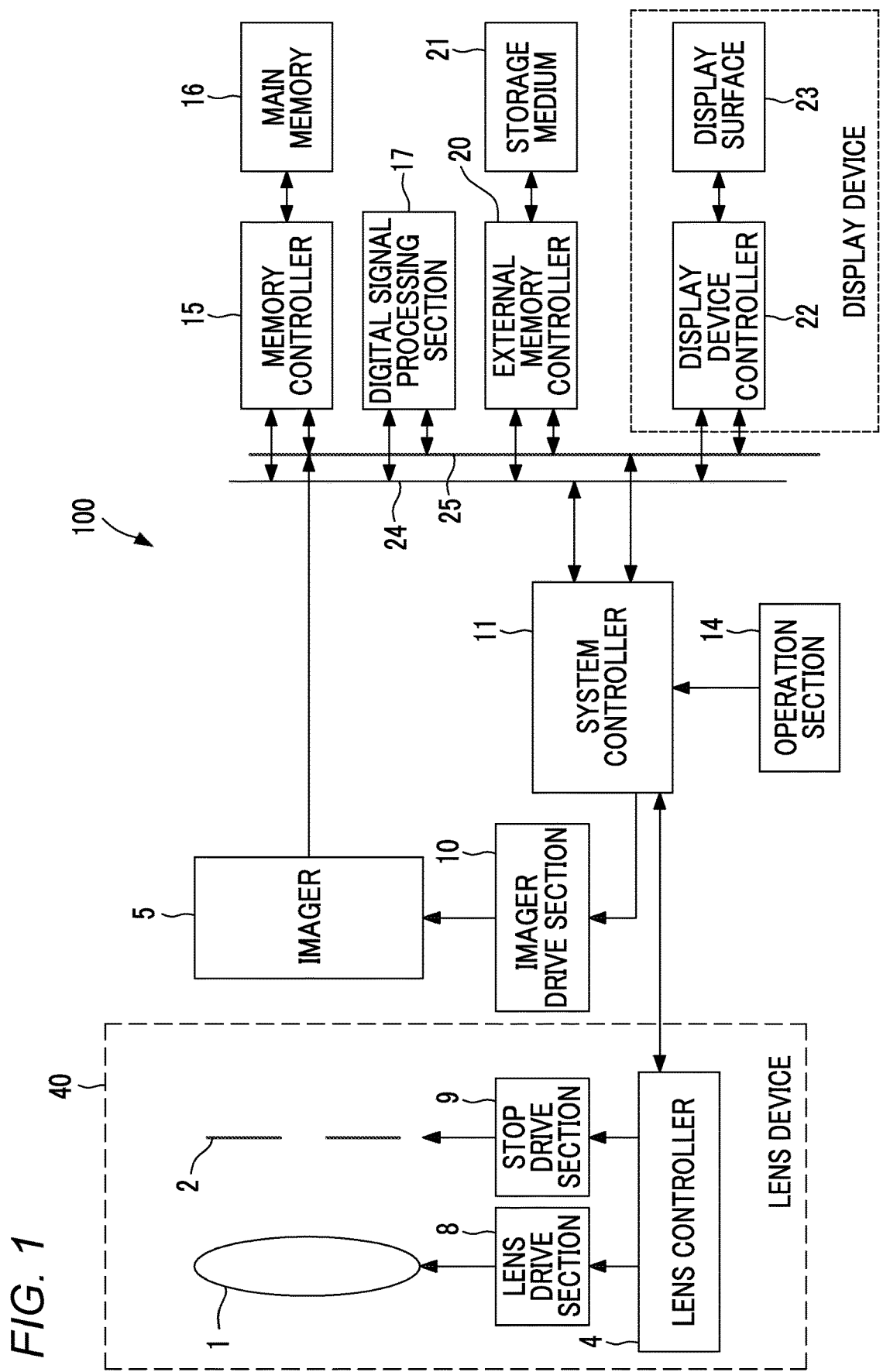
FIG. 1 is a diagram illustrating a schematic configuration of a digital camera 100 which is an embodiment of an imaging apparatus of the present invention.

FIG. 1 is a diagram illustrating a schematic configuration of a digital camera 100 which is an embodiment of an imaging apparatus of the present invention.

The digital camera 100 illustrated in FIG. 1 comprises a lens device 40 having an imaging lens 1, a stop 2, a lens controller 4, a lens driving section 8, and a stop driving section 9.

The lens device 40 may be attachable to and detachable from the digital camera 100 or may be integrated with the digital camera 100.

The imaging lens 1 and the stop 2 constitute an imaging optical system, and the imaging lens 1 includes a focus lens or a zoom lens movable in the optical axis direction. The imaging optical system may have a fixed focal length.

The lens controller 4 of the lens device 40 is configured to be capable of communicating with the system controller 11 of the digital camera 100 through wire or wireless.

The lens controller 4 controls the focus lens included in the imaging lens 1 via the lens driving section 8 to change a position of principal point of the focus lens (to change the focal length), or controls an opening amount of the stop 2 through the stop driving section 9, according to a command from the system controller 11.

The digital camera 100 further comprises a CMOS imager 5 that images a subject through an imaging optical system.

The imager 5 has an imaging surface in which a plurality of pixels are two-dimensionally arranged, and converts a subject image formed on the imaging surface by the imaging optical system into a pixel signal by the plurality of pixels and outputs the pixel signal. Hereinafter, a set of pixel signals output from each pixel of the imager 5 is referred to as a captured image signal.

The system controller 11, which controls entire electric control system of the digital camera 100, drives the imager 5 through the imager driving section 10, and a subject image captured through the imaging optical system of the lens device 40 is output as a captured image signal.

A command signal from a user is input to the system controller 11 through the operation section 14.

The system controller 11 integrally controls the entire digital camera 100, and the hardware structure is various processors that execute programs including an imaging program to perform processing.

Various kinds of processors include a programmable logic device (PLD) that is a processor capable of changing a circuit configuration after manufacturing of a central processing unit (CPU), a field programmable gate array (FPGA), or the like as a general-purpose processor that performs various kinds of processing by executing programs, a dedicated electric circuit that is a processor having a circuit configuration designed exclusively for executing specific processing of an application specific integrated circuit (ASIC) or the like, and the like.

More specifically, a structure of these various processors is an electric circuit in which circuit elements such as semiconductor elements are combined.

The processor of the system controller 11 may be configured as one of various processors, or may be configured as a combination of two or more of the same or different kinds of processors (for example, a combination of a plurality of FPGAs or a combination of a CPU and an FPGA).

Further, the electric control system of the digital camera 100 comprises a main memory 16 composed of a random access memory (RAM), a memory controller 15 for storing data in the main memory 16 and reading out data from the main memory 16, a digital signal processing section 17 that performs digital signal processing on the captured image signal output from the analog-to-digital conversion circuit 7 and generates captured image data according to various formats such as joint photographic experts group (JPEG) format, an external memory controller 20 that controls data storage to the storage medium 21 and data readout from the storage medium 21, a display surface 23 configured of an organic electroluminescence (EL) panel or a liquid crystal panel, and a display device controller 22 for controlling the display of the display surface 23. The display surface 23 and the display device controller 22 constitute a display device.

The storage medium 21 is a semiconductor memory such as a flash memory, which is built into the digital camera 100, or a portable semiconductor memory which is attachable to and detachable from the digital camera 100.

The memory controller 15, the digital signal processing section 17, the external memory controller 20, and the display device controller 22 are mutually connected by the control bus 24 and the data bus 25, and are controlled by commands from the system controller 11.

The digital signal processing section 17 has various hardware structures, such as the various processors, exemplified above, which execute programs and perform processing.

The display device controller 22 includes the various processors, exemplified above, which execute programs and perform processing, and a display memory for holding data of an image to be displayed.

Figure 2:
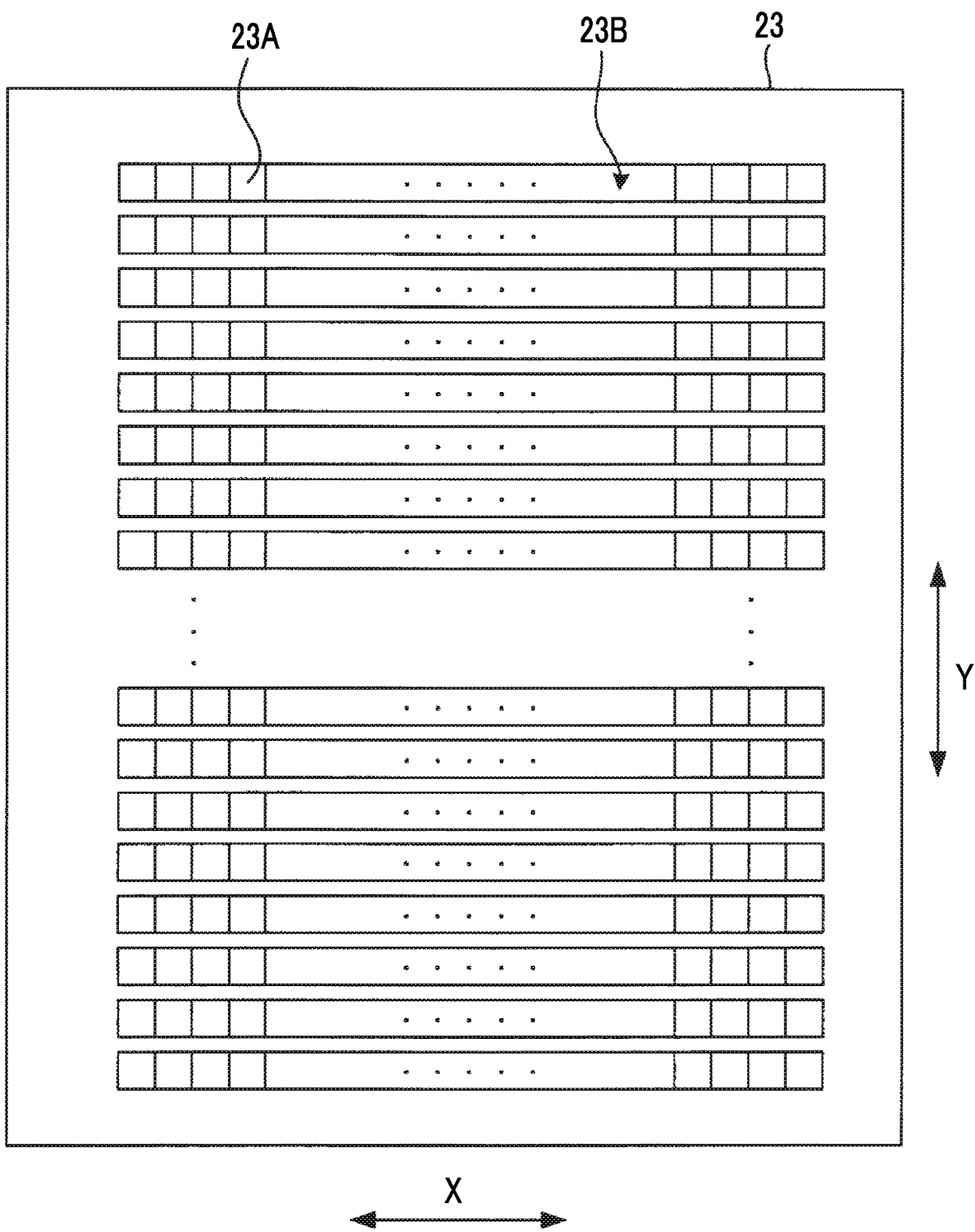
FIG. 2 is a schematic plan view illustrating a schematic configuration of a display surface 23 illustrated in FIG. 1.

FIG. 2 is a schematic plan view illustrating a schematic configuration of a display surface 23 illustrated in FIG. 1.

The display surface 23 is a surface in which a plurality of display pixel rows 23B, consist of a plurality of display pixels 23A aligned in a row direction X which is one direction, are arranged in a column direction Y which is orthogonal to the row direction X.

The display device controller 22 performs the drawing update process that sequentially updates a line image to be drawn on the display pixel row 23B, from the display pixel row 23B at the upper end (one end) of the display surface 23 in the column direction Y toward the display pixel row 23B at the lower end (the other end), to display a live view image composed of the same number of line images as the display pixel row 23B on the display surface 23.

Figure 3:
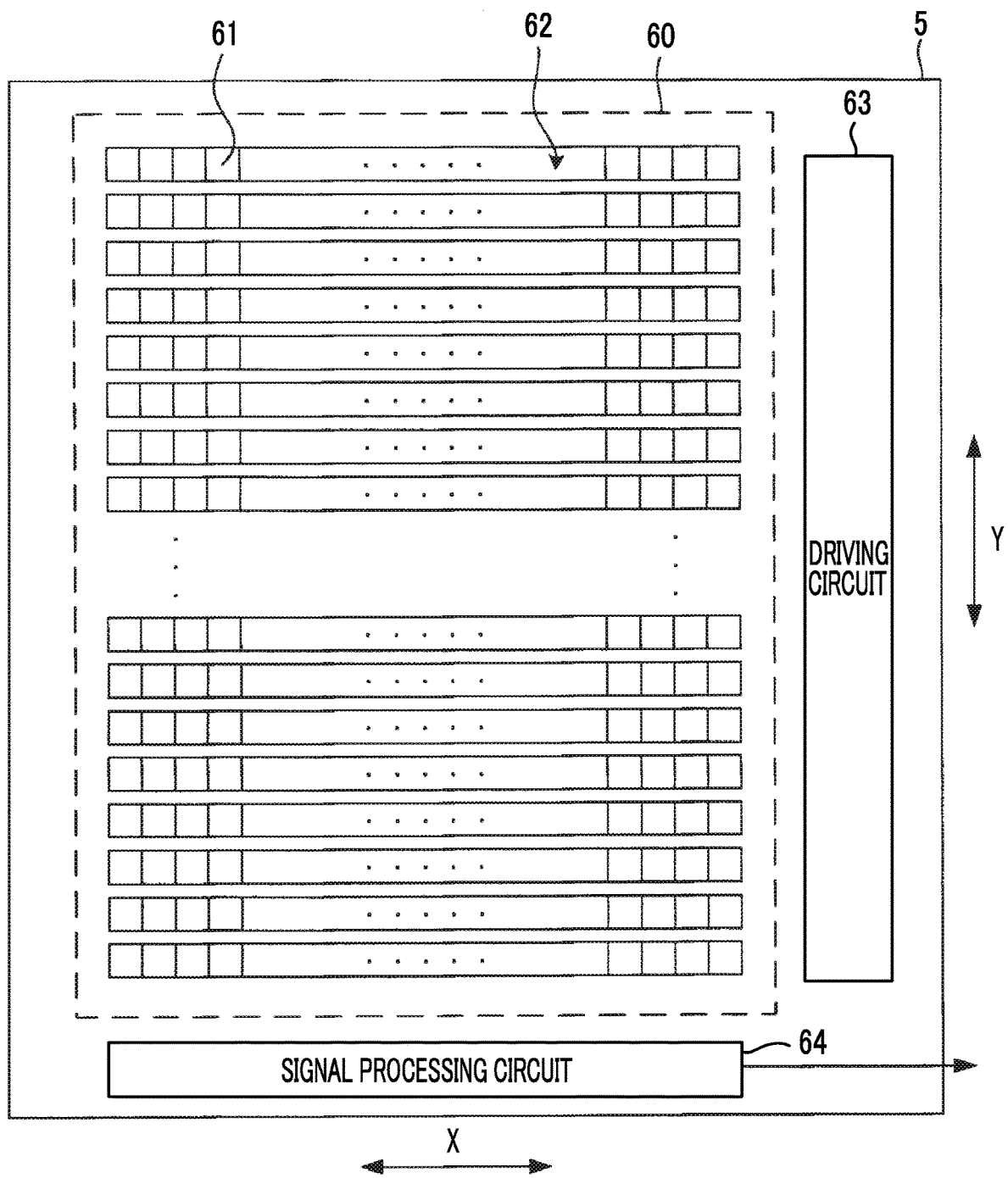
FIG. 3 is a schematic plan view illustrating a schematic configuration of an imager 5 illustrated in FIG. 1.
Figure 4:
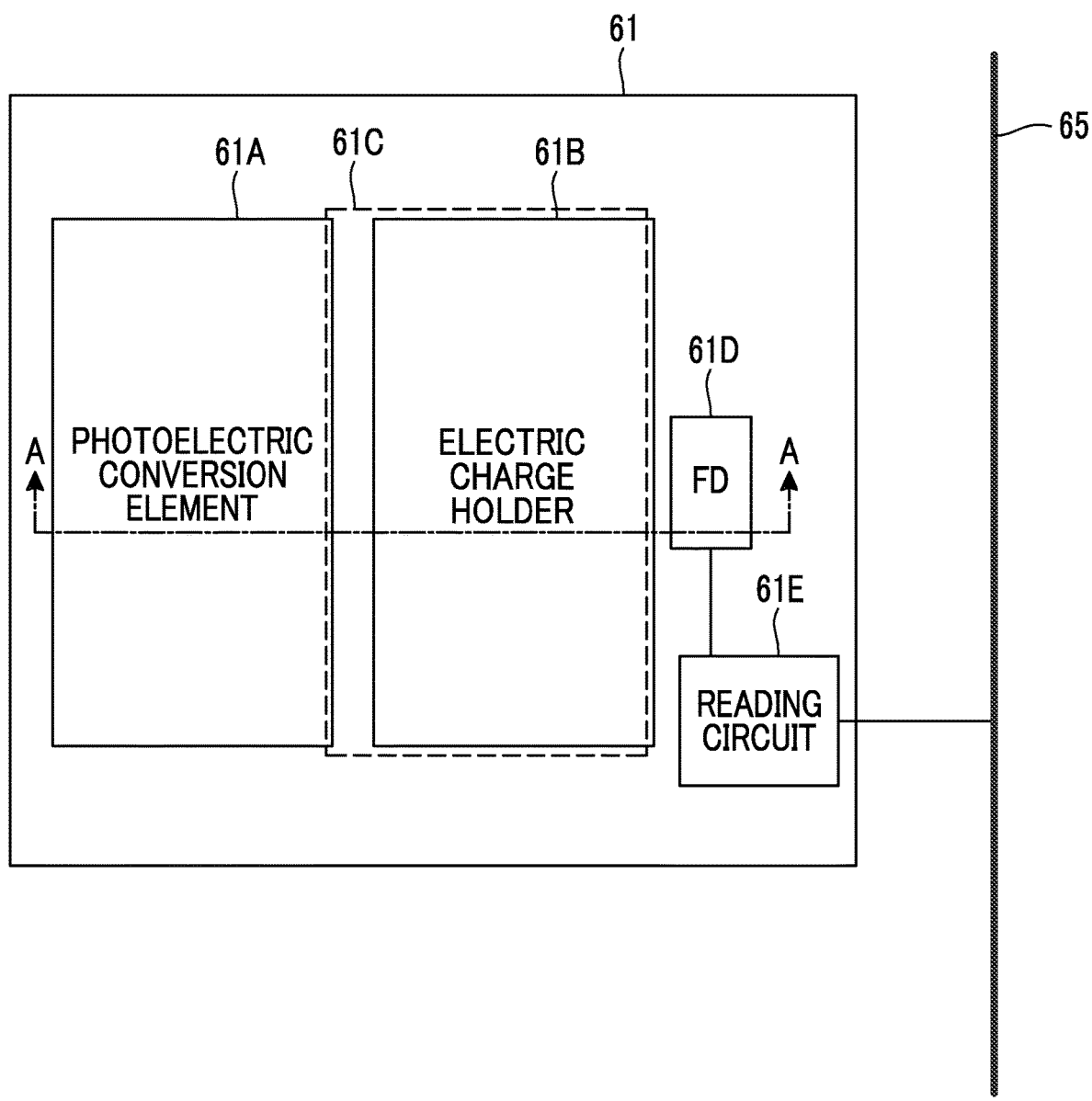
FIG. 4 is a schematic plan view illustrating a schematic configuration of a pixel 61 of the imager 5 illustrated in FIG. 3.
Figure 5:
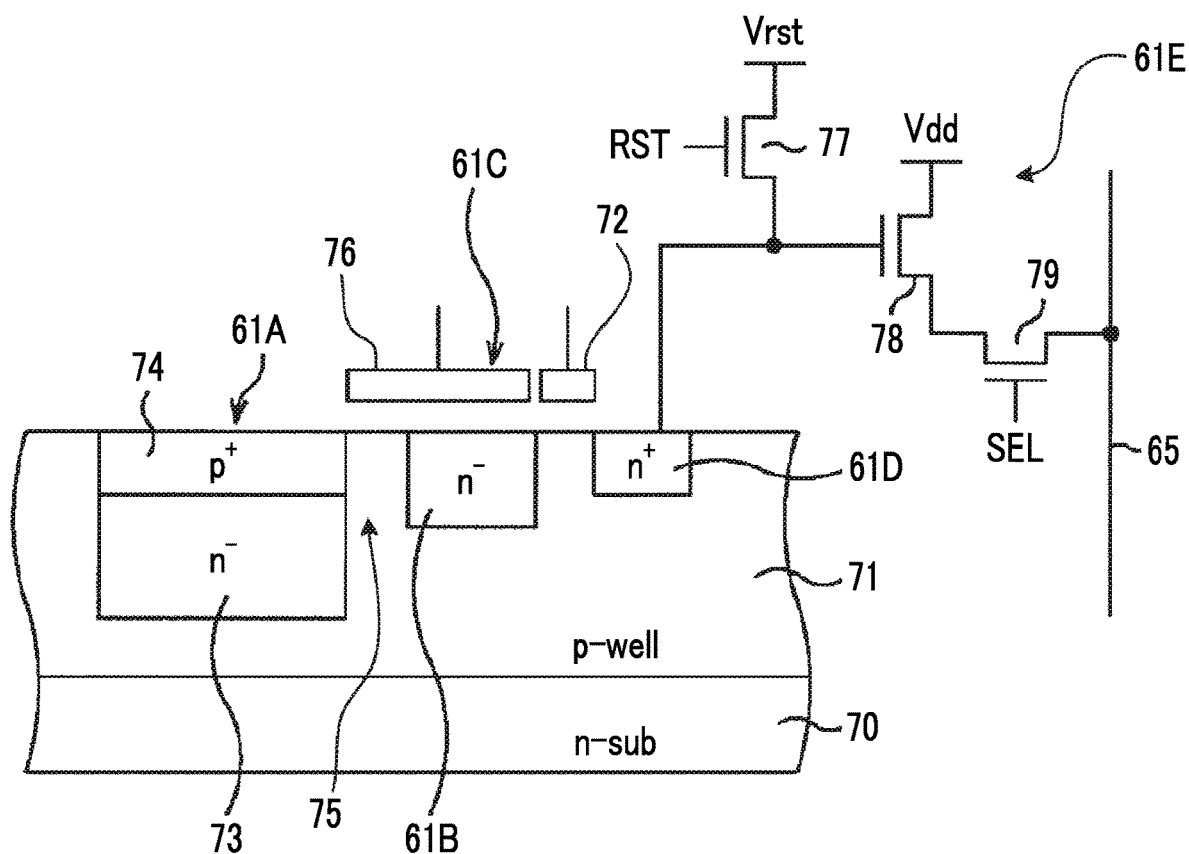
FIG. 5 is a cross-sectional view taken along a line A-A line of the pixel 61 of the imager 5 illustrated in FIG. 4.

FIG. 3 is a schematic plan view illustrating a schematic configuration of an imager 5 illustrated in FIG. 1. FIG. 4 is a schematic plan view illustrating a schematic configuration of a pixel 61 of the imager 5 illustrated in FIG. 3. FIG. 5 is a cross-sectional view taken along a line A-A line of the pixel 61 of the imager 5 illustrated in FIG. 4.

The imager 5 comprises an imaging surface 60 in which a plurality of pixel rows 62 composed of a plurality of pixels 61 arranged in the row direction X are arranged in a plurality of column directions Y orthogonal to the row direction X, a driving circuit 63 for driving the pixels 61 arranged on the imaging surface 60, and a signal processing circuit 64 that processes a pixel signal, read out from each pixel 61 of the pixel row 62 arranged on the imaging surface 60, to the signal line.

Hereinafter, upper side end of the imaging surface 60 in the column direction Y in FIG. 3 is referred to as upper end, and lower side end of the imaging surface 60 in the column direction Y is referred to as lower end. The upper end constitutes one end of the imaging surface 60, and the lower end constitutes the other end of the imaging surface 60.

As illustrated in FIG. 4, the pixel 61 comprises a photoelectric conversion element 61A, an electric charge holder 61B, an electric charge transfer unit 61C, a floating diffusion 61D, and a reading circuit 61E formed on a semiconductor substrate.

The photoelectric conversion element 61A receives the light passing through the imaging optical system of the lens device 40, and generates and accumulates an electric charge corresponding to the amount of light received. The photoelectric conversion element 61A is configured of a photodiode or the like.

The electric charge transfer unit 61C transfers the electric charge accumulated in the photoelectric conversion element 61A to the electric charge holder 61B. The electric charge transfer unit 61C is composed of an impurity region in the semiconductor substrate and an electrode formed above the impurity region.

A voltage applied to the electrodes composing the electric charge transfer unit 61C is controlled by the driving circuit 63, whereby electric charge transfer from the photoelectric conversion element 61A to the electric charge holder 61B is performed.

The electric charge holder 61B holds the electric charge transferred from the photoelectric conversion element 61A, by the electric charge transfer unit 61C. The electric charge holder 61B is composed of an impurity region in the semiconductor substrate.

The floating diffusion 61D is for converting electric charge into a signal, and the electric charge held by the electric charge holder 61B is transferred.

The reading circuit 61E is a circuit that reads out a signal, corresponding to a potential of the floating diffusion 61D, as a pixel signal, to the signal line 65. The reading circuit 61E is driven by the driving circuit 63.

As illustrated in FIG. 5, a P well layer 71 is formed on the surface of the N-type substrate 70, and a photoelectric conversion element 61A is formed on the surface of the P well layer 71.

The photoelectric conversion element 61A is configured of an N-type impurity layer 73 and a P-type impurity layer 74 formed thereon. The N-type substrate 70 and the P well layer 71 constitute a semiconductor substrate.

On the surface portion of the P well layer 71, an electric charge holder 61B formed of an N-type impurity layer is formed to be slightly spaced from the photoelectric conversion element 61A.

A transfer electrode 76 is formed above a region 75 of the P well layer 71 between the electric charge holder 61B and the photoelectric conversion element 61A via an oxide film (not shown).

The region 75 and the transfer electrode 76 constitute the electric charge transfer unit 61C. In the example of FIG. 4, the transfer electrode 76 is formed to the upper side of the electric charge holder 61B, but the transfer electrode 76 may be formed at least above the region 75.

By controlling the potential of the transfer electrode 76 and forming a channel in the region 75, the electric charge accumulated in the photoelectric conversion element 61A can be transferred to the electric charge holder 61B. The potential of the transfer electrode 76 is controlled by the driving circuit 63.

On the surface portion of the P well layer 71, a floating diffusion 61D formed of an N-type impurity layer is formed to be slightly spaced from the electric charge holder 61B.

Above the P well layer 71 between the electric charge holder 61B and the floating diffusion 61D, a reading electrode 72 is formed via an oxide film (not shown).

By controlling a potential of the reading electrode 72 to form a channel in the region between the electric charge holder 61B and the floating diffusion 61D, the electric charge held by the electric charge holder 61B can be transferred to the floating diffusion 61D. The potential of the reading electrode 72 is controlled by the driving circuit 63.

In the example illustrated in FIG. 5, the reading circuit 61E includes a reset transistor 77 for resetting the potential of the floating diffusion 61D, an output transistor 78 that converts the potential of the floating diffusion 61D into a pixel signal and outputs the pixel signal, and a selection transistor 79 for selectively read out the pixel signal output from output transistor 78 to the signal line 65. The configuration of the reading circuit is an example, and is not limited to this.

The reading circuit 61E may be shared by a plurality of pixels 61.

The driving circuit 63 illustrated in FIG. 3 drives the transfer electrode 76, the reading electrode 72, and the reading circuit 61E of each pixel 61 independently for each pixel row 62, to perform reset of each photoelectric conversion element 61A included in the pixel row 62 (discharge of the electric charge accumulated in the photoelectric conversion element 61A), readout of a pixel signal corresponding to the electric charge accumulated in each photoelectric conversion element 61A to the signal line 65, and the like.

Further, the driving circuit 63 simultaneously drives the electric charge transfer units 61C of all the pixels 61 to simultaneously transfer the electric charges from the photoelectric conversion elements 61A to the electric charge holder 61B of the respective pixels 61. The driving circuit 63 is controlled by the imager driving section 10.

The photoelectric conversion element 61A is reset by resetting the floating diffusion 61D by the reset transistor 77, in a state in which the electric charge transfer unit 61C can transfer electric charges and a channel is formed in the semiconductor substrate below the reading electrode 72.

It may be configured that an electric charge discharging region is separately provided adjacent to the photoelectric conversion element 61A, and the driving circuit 63 diselectric charges the electric charge accumulated in the photoelectric conversion element 61A to the electric charge discharging region, to reset the photoelectric conversion element 61A.

The signal processing circuit 64 illustrated in FIG. 3 performs a correlative double sampling processing on the pixel signal read out from each pixel 61 of the pixel row 62 to the signal line 65, converts the pixel signal, which is subjected to the correlative double sampling processing, into a digital signal, and outputs the signal to the data bus 25. The signal processing circuit 64 is controlled by the imager driving section 10.

The total number M of the pixel rows 62 formed on the imaging surface 60 of the imager 5 is larger than the total number m of display pixel rows 23B formed on the display surface 23.

In the digital camera 100, the m pixel rows 62, among the M pixel rows 62 formed on the imaging surface 60, arranged at regular intervals in the column direction Y, are set as display target pixel rows. Hereinafter, the pixel row 62 set as the display target pixel row is also referred to as the display target pixel row 62.

In the display target pixel row 62 which is i-th (i is 1 to m) counting from the upper end of the imaging surface 60, an i-th display pixel row 23B counted from the upper end of the display surface 23 is managed in association with the i-th display target pixel row 62.

The total number M and the total number m may be the same, and in this case, in the display target pixel row 62 which is j-th (j is 1 to M) counting from the upper end of the imaging surface 60, a j-th display pixel row 23B counting from the upper end of the display surface 23 is managed in association with the j-th display target pixel row 62.

Figure 6:
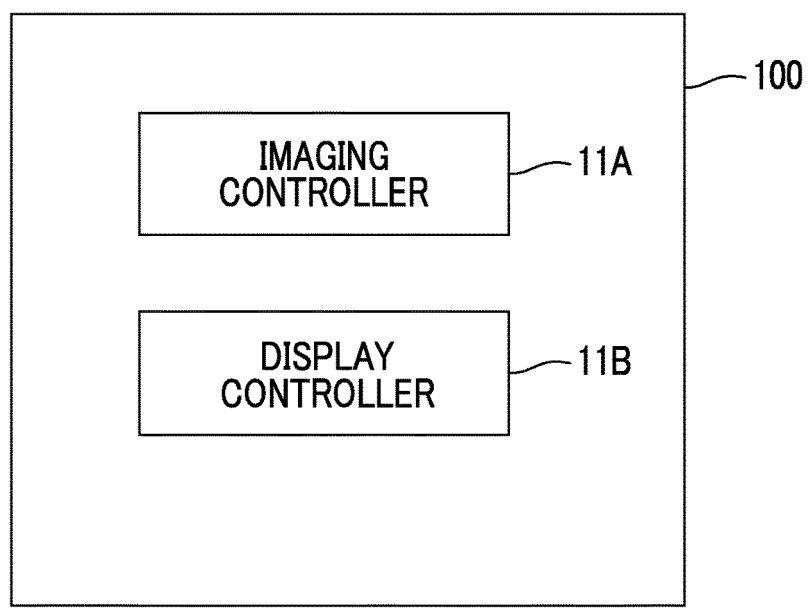
FIG. 6 is a functional block diagram of the digital camera 100 illustrated in FIG. 1.

FIG. 6 is a functional block diagram of the digital camera 100 illustrated in FIG. 1.

The digital camera 100 comprises an imaging controller 11A and a display controller 11B, as functional blocks.

The system controller 11 functions as an imaging controller 11A and a display controller 11B, by executing a program including an imaging program.

The imaging controller 11A controls the imager driving section 10 to perform a set consist of a global reset drive, a global shutter drive, and a rolling readout drive. A subject image captured by the imager 5 is obtained as a captured image signal, by performing this set.

The global reset drive is a drive that simultaneously resets the photoelectric conversion element 61A of each pixel 61 formed on the imaging surface 60 of the imager 5, and simultaneously starts the exposure of each pixel 61.

The global shutter drive is a drive that transfers the electric charge accumulated in the photoelectric conversion element 61A of each pixel 61 to the electric charge holder 61B by the exposure started in each pixel 61 by the global reset drive, and simultaneously ends the exposure of each pixel 61.

The rolling readout drive is a drive that sequentially reading out, for each pixel row 62, pixel signals corresponding to the electric charges held in each electric charge holder 61B by the global shutter drive.

The imaging controller 11A executes a first rolling readout drive that reads out pixel signals in order from the specific pixel row 62 between the pixel rows 62 at both ends in the column direction Y of the imaging surface 60 to the pixel row 62 at the lower end of the imaging surface 60, reads out the pixel signals in order and reading out the pixel signals from the pixel row 62 at the lower end of the imaging surface 60, then reads out the pixel signals sequentially from the pixel row 62 at the upper end of the imaging surface 60 to the specific pixel row 62, as the above-described rolling readout drive.

Figure 7:
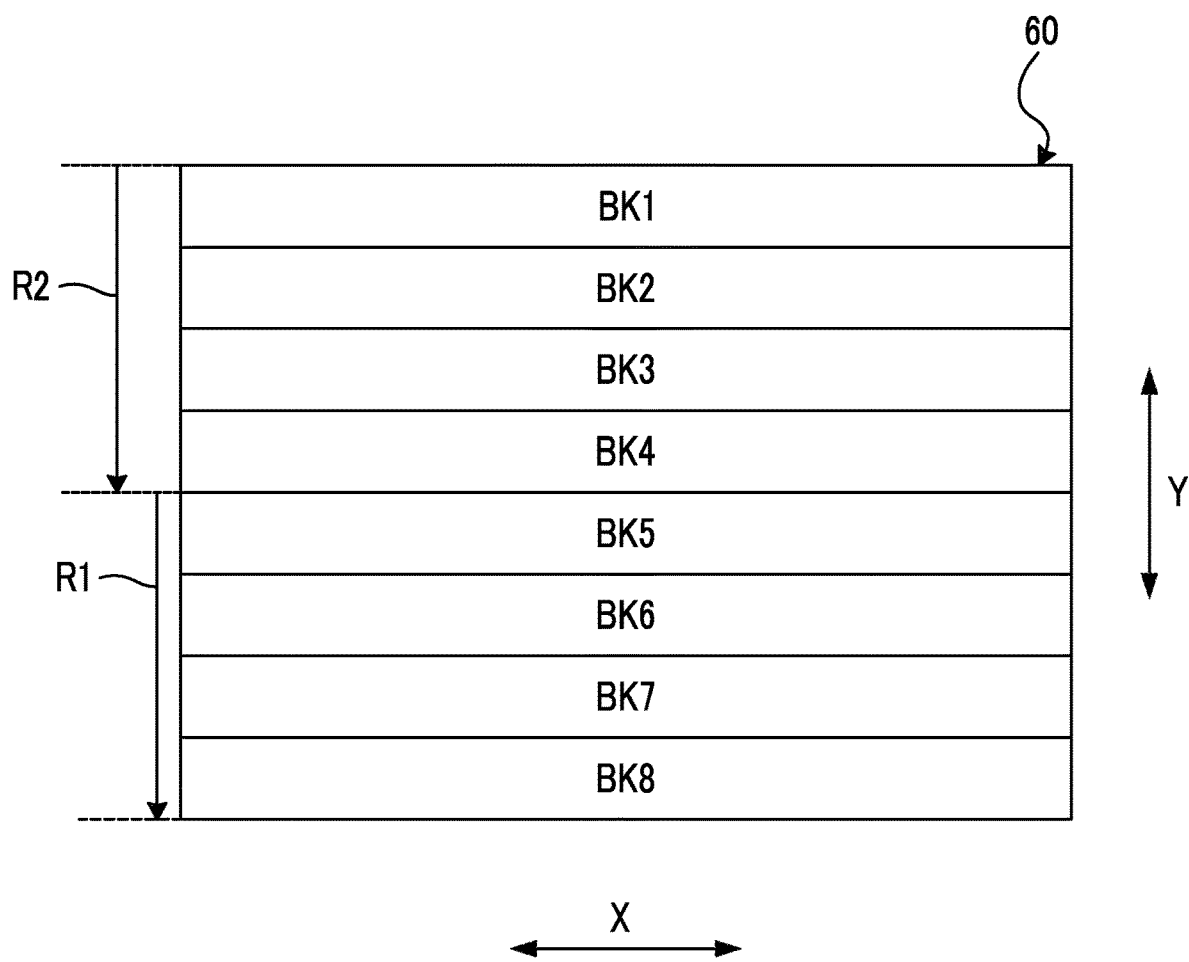
FIG. 7 is a schematic view for explaining a first rolling readout drive by an imaging controller 11A.

FIG. 7 is a schematic view for explaining the first rolling readout drive by the imaging controller 11A.

In the example of FIG. 7, the imaging surface 60 of the imager 5 is divided into eight blocks BK1 to BK8 aligned in the column direction Y. Each of blocks includes a plurality of pixel rows 62.

For example, among the plurality of pixel rows 62 included in the block BK5 in the vicinity of the center in the column direction Y of the imaging surface 60, a pixel row 62 closest to the upper end side of the imaging surface 60 (that is, a central pixel row 62 in the column direction Y of the imaging surface 60) is preset as the specific pixel row 62.

When the imaging controller 11A executes the first rolling readout drive, as indicated by the arrow R1 in FIG. 7, first, pixel signals are read out in order from the specific pixel row 62 at the upper end of the block BK5 to the lower end of the imaging surface 60.

When reading out the pixel signal from the pixel row 62 at the lower end of the imaging surface 60 is finished, as indicated by the arrow R2 in FIG. 7, the imaging controller 11A reads out the pixel signals in order from the pixel row 62 at the upper end of the imaging surface 60 to the specific pixel row 62. Then, the imaging controller 11A ends the first rolling readout drive at a time the pixel signal is read out from the pixel row 62 adjacent to the upper end side of the imaging surface 60 with respect to the specific pixel row 62.

The specific pixel row 62 described above is selected from among the display target pixel rows.

The digital signal processing section 17 illustrated in FIG. 1 processes the pixel signal group sequentially output from the display target pixel row 62 of the imager 5 by the first rolling readout drive, to sequentially generate line data which is corresponding to the display pixel row 23B corresponding to the display target pixel row 62, and transfer the generated line data to the display device controller 22. A set of line data constitutes live view image data.

The display controller 11B illustrated in FIG. 6 causes the display surface 23 to display a live view image based on the live view image data obtained by the first rolling readout drive, through the display device controller 22.

Specifically, the display controller 11B generates a vertical synchronization signal for a start instruction of the drawing update process by the display device controller 22, and supplies the vertical synchronization signal to the display device controller 22.

The display device controller 22 starts the drawing update process in a case where the vertical synchronization signal input from the display controller 11B falls. In a case where the vertical synchronization signal falls, the display device controller 22 sequentially selects the display pixel rows 23B from the upper end to the lower end of the display surface 23, and a line image is drawn on the selected display pixel row 23B, of which the line image is based on the line data corresponding to the selected display pixel row 23B.

The display controller 11B determines the falling timing of the vertical synchronization signal that defines the timing of the start instruction of the drawing update process to the display device controller 22, based on the start timing of the first rolling readout drive.

Specifically, the display controller 11B sets the falling timing of the vertical synchronization signal to a timing a predetermined time before the start timing of the first rolling readout drive.

The predetermined time is set to a time that a drawing update timing of the display pixel row 23B corresponding to the specific pixel row 62 in the drawing update process and a timing after the elapse of a predetermined time T1 from the start timing of the first rolling readout drive coincide each other.

The time T1 is a time required from reading out of a pixel signal from a specific pixel row 62 to be started and line data to be generated from the pixel signal, to the generated line data to be received by the display device controller 22, and is a time that is determined by processing capabilities of various processors and by a time taken to transfer data.

Figure 8:
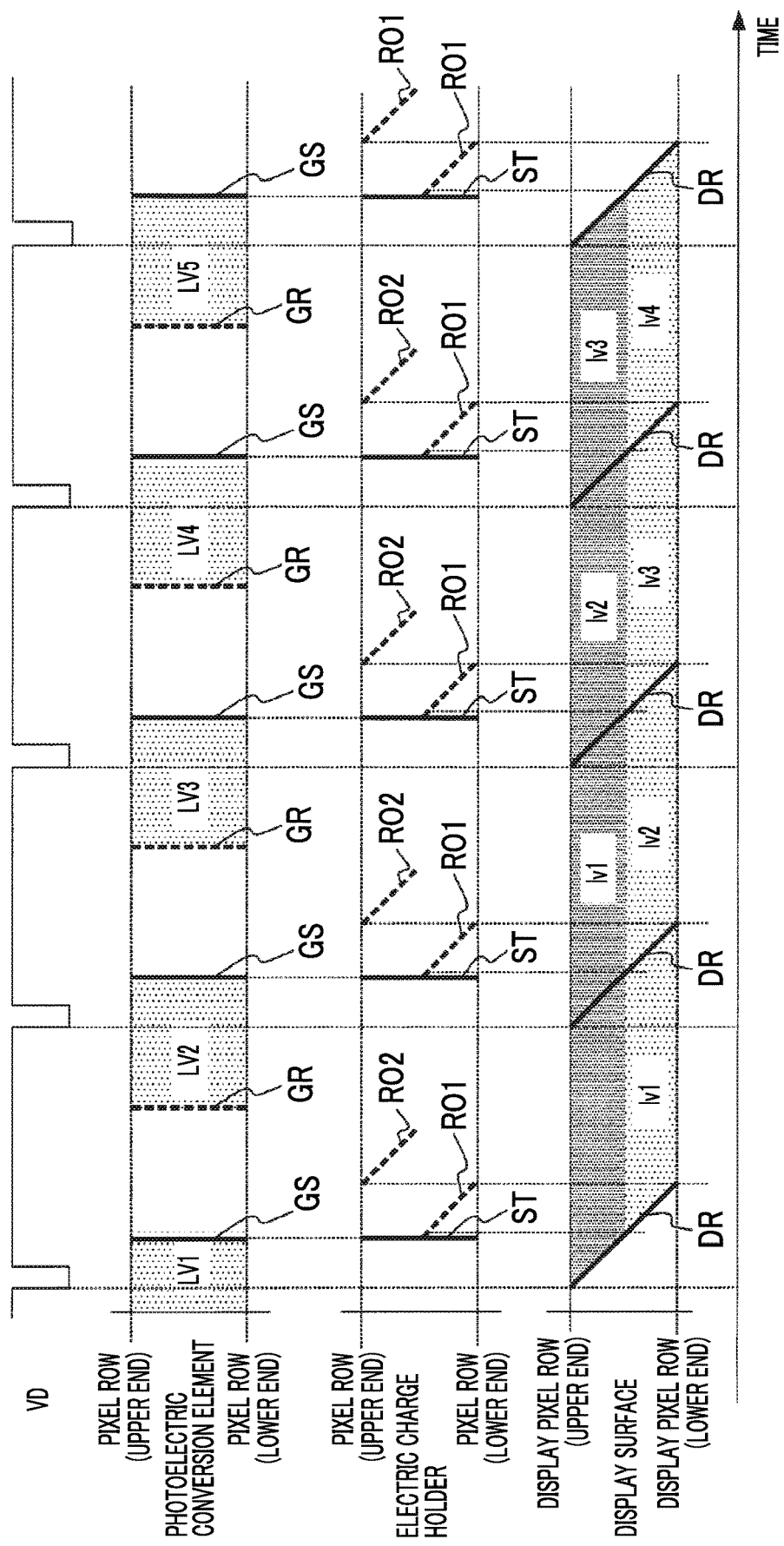
FIG. 8 is a timing chart illustrating operations in a continuous imaging mode of the digital camera 100 illustrated in FIG. 1.

FIG. 8 is a timing chart illustrating operations in a continuous imaging mode of the digital camera 100 illustrated in FIG. 1.

The horizontal axis in FIG. 8 indicates time. A vertical synchronization signal VD supplied from the display controller 11B to the display device controller 22 is illustrated in upper part of FIG. 8.

A driving timing of the photoelectric conversion elements 61A and the electric charge holder 61B of each pixel row 62 of the imager 5 is illustrated in middle part of FIG. 8. In the middle part of FIG. 8, the vertical axis indicates the position of the pixel row 62 in the column direction Y.

A straight line GR illustrated in the middle part of FIG. 8 indicates a timing at which each photoelectric conversion element 61A included in the pixel row 62 is reset.

A straight line GS illustrated in the middle part of FIG. 8 indicates a timing at which electric charges are transferred from the photoelectric conversion elements 61A included in the pixel row 62 to the electric charge holder 61B. A period surrounded by the straight line GR and the straight line GS right next to the straight line GR indicates the exposure period (LV1 to LV5) of the imager 5.

A straight line ST illustrated in the middle part of FIG. 8 indicates a timing at which electric charge is held in the electric charge holder 61B.

Straight lines RO1 and RO2 illustrated in the middle part of FIG. 8 indicate timings at which a pixel signal corresponding to the electric charge held by the electric charge holder 61B is output from the imager 5.

Drawing state of the display surface 23 is illustrated in lower part of FIG. 8. In the lower part of FIG. 8, vertical axis indicates a position in the column direction Y of the display pixel row 23B of the display surface 23.

A straight line DR illustrated in the lower part of FIG. 8 indicates a timing at which drawing is performed on the display pixel row 23B of the display surface 23.

In a case where the imaging controller 11A receives a continuous imaging start instruction, the imaging controller 11A performs global reset drive indicated by the straight line GR, and resets the photoelectric conversion elements 61A simultaneously in all the pixel rows 62. Thereby, exposure starts at the same timing in all the pixel rows 62.

Thereafter, when a predetermined exposure time has elapsed, the imaging controller 11A performs global shutter drive indicated by the straight line GS. By this driving, electric charges are transferred from the photoelectric conversion element 61A to the electric charge holder 61B simultaneously in all the pixel rows 62, and the electric charge holder 61B holds the electric charge as indicated by the straight line ST. Thereby, the exposure ends at the same timing in all the pixel rows 62.

After performing the global shutter drive indicated by the straight line GS, the imaging controller 11A performs the first rolling readout drive indicated by the straight lines RO1 and RO2.

In the first rolling readout drive, as indicated by the straight line RO1, the imaging controller 11A selects pixel rows 62 in order from a specific pixel row 62 of the imaging surface 60 to the lower end of the imaging surface 60, and a pixel signal is read out from the selected pixel row 62.

When the readout of the pixel signal by the straight line RO1 is completed, the imaging controller 11A selects the pixel row 62 in order from the pixel row 62 at the upper end of the imaging surface 60 to the specific pixel row 62 as illustrated by the straight line RO2, and reads out a pixel signal from the selected pixel row 62.

Thus, the imaging controller 11A that has received the continuous imaging start instruction performs a first set, the set consists of the global reset drive indicated by the straight line GR, the global shutter drive indicated by the straight line GS, and the first rolling readout drive indicated by the straight lines RO1 and RO2, a plurality of times in succession.

The captured image signals output from the imager 5 by the first rolling readout drive in each of the first sets are processed by the digital signal processing section 17 to be captured image data, and stored in the storage medium 21.

The display device controller 22 starts the drawing update process at the falling timing of the vertical synchronization signal VD. On the other hand, in the digital camera 100, the vertical synchronization signal VD falls at a timing before the predetermined time described above, from the start timing of the first rolling readout drive indicated by the straight lines RO1 and RO2.

Therefore, in a case where a pixel signal is output from the display target pixel row 62 to the data bus 25 by driving indicated by the straight line RO1, line data is generated based on the pixel signal, and a line image based on the line data is immediately drawn to the display pixel row 23B corresponding to the display target pixel row 62, as indicated by the straight line DR.

Thereafter, when a pixel signal is output from the display target pixel row 62 to the data bus 25 by driving indicated by the straight line RO2, line data is generated based on the pixel signal, and the generated line data is held in a memory in the display device controller 22.

After the end of driving indicated by the straight line RO2, when the vertical synchronization signal VD falls, as indicated by the straight line DR, a plurality of line data held in the memory in the display device controller 22 (the line data obtained immediately before, by the straight line RO2) are sequentially drawn on the corresponding display pixel row 23B.

In FIG. 8, live view images obtained in the exposure periods LV1 to LV4 are indicated by lv1 to lv4, respectively.

Here, the operation in the case of performing continuous imaging for storing captured image data in the storage medium 21 is taken as an example, but a drive timing chart in the case of performing imaging continuously for displaying a live view image is also similar to illustrated in FIG. 8.

Further, at the time of continuous imaging for displaying a live view image until the continuous imaging start instruction is issued, the imager 5 may be driven by a rolling shutter method.

As described above, according to the digital camera 100 of FIG. 1, in a case where the subject is imaged by performing the global reset drive and the global shutter drive, display of the live view image can be started sequentially from the subject imaged in the vicinity of the center in the column direction Y of the imaging surface 60.

A main subject that a user wants to focus on is often imaged near the center of the imaging surface 60. Therefore, according to this configuration, the main subject can be instantaneously confirmed on the display surface 23 after the end of imaging, and a risk of losing sight of the main subject in continuous imaging can be reduced.

The specific pixel row 62 from which the pixel signal is first read out in the first rolling readout drive may be located between the upper end and the lower end of the imaging surface 60, and the position in the column direction Y is not limited.

Although the specific pixel row 62 is the display target pixel row in the above description, the specific pixel row 62 may be a pixel row 62 other than the display target pixel row.

In this case, the display pixel row 23B corresponding to the specific pixel row 62 may be treated as a display pixel row 23B corresponding to the display target pixel row 62 closest to the specific pixel row 62 on the lower end side of the imaging surface 60.

Also, in this case, the time T1 between a drawing update timing of the display pixel row 23B corresponding to the specific pixel row 62 and a timing which the first rolling readout drive starts and which immediately before the drawing update timing, is a time from the first rolling readout drive to be started, a pixel signal of the display target pixel row 62 closest to the specific pixel row 62 to be read, line data based on the pixel signal to be generated, to the line data to be received by the display device controller 22.

Also, in the above description, a position of the specific pixel row 62 is determined to be one in advance, but the position may be changed between a plurality of positions manually or automatically.

Figure 9:
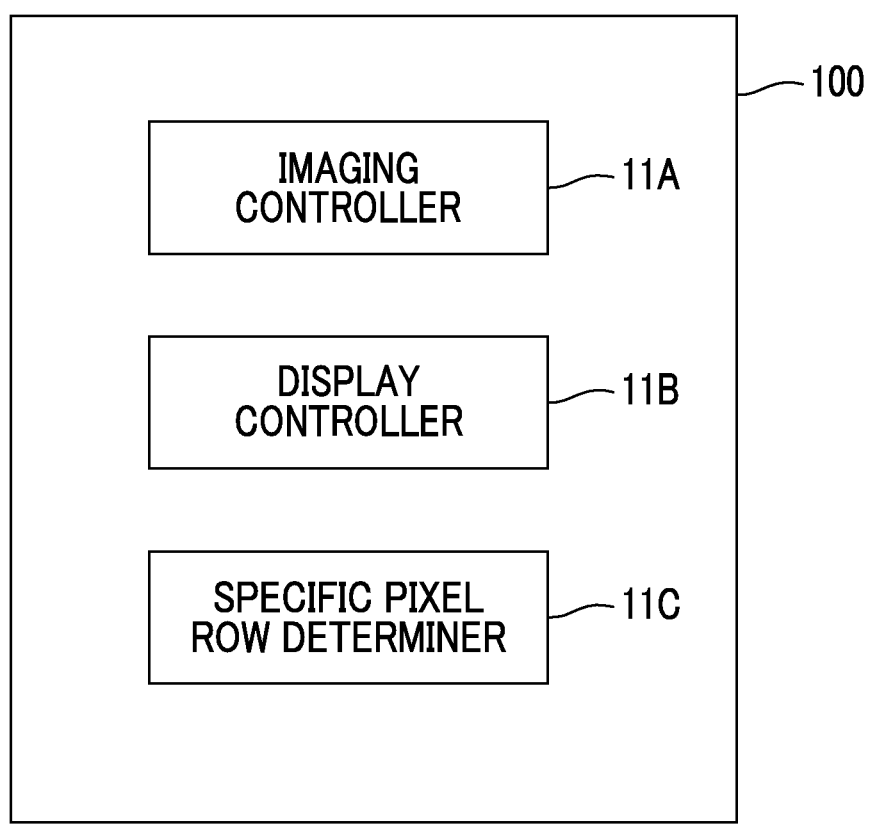
FIG. 9 is a diagram illustrating a modification example of the functional block of the digital camera 100 illustrated in FIG. 1.

FIG. 9 is a diagram illustrating a modification example of the functional block of the digital camera 100 illustrated in FIG. 1. In FIG. 9, same configuration as in FIG. 6 will be denoted with same reference numerals, and a description thereof will be omitted. A hardware configuration of the digital camera 100 illustrated in FIG. 9 is the same as that of FIG. 1, and a description thereof will be omitted.

The digital camera 100 illustrated in FIG. 9 comprises an imaging controller 11A, a display controller 11B, and a specific pixel row determiner 11C, as functional blocks.

The system controller 11 functions as an imaging controller 11A, a display controller 11B, and a specific pixel row determiner 11C, by executing a program including an imaging program.

The specific pixel row determiner 11C determines the specific pixel row 62 described above, by any of the following [First method] to [Fourth method].

For example, during a period that an imaging instruction (a continuous imaging instruction, in the example of FIG. 8) for storing captured image data is issued, the specific pixel row determiner 11C sets a display target pixel row at the center of the imaging surface 60 in the column direction Y as a specific pixel row 62, and determines a specific pixel row 62 to be set after receiving the continuous imaging instruction during the period, by following methods.

[First method] The specific pixel row determiner 11C determines a specific pixel row 62 based on the input signal from the operation section 14.

As an example, a touch panel in which the operation section 14 is integrated with the display surface 23 is used. When a user touches any position on the display surface 23 with the touch panel, an input signal indicating the position is input to the system controller 11.

The specific pixel row determiner 11C determines a display target pixel row corresponding to the display pixel row 23B at the touched position, as the specific pixel row 62.

According to this method, the user can freely set the readout start position of the pixel signal at the time of the first rolling readout drive after the exposure period. Therefore, the risk of losing sight of the main subject can be further reduced.

[Second method] The specific pixel row determiner 11C determines any of the display target pixel rows included in the focusing target area set in the imaging surface 60, as a specific pixel row 62.

In the digital camera 100, a plurality of focusing target areas are set on the imaging surface 60. Then, the system controller 11 controls the focus lens included in the imaging optical system to perform focus adjustment, in order to focus on a subject to be imaged by the selected focusing target area.

The system controller 11 selects an area designated by a user operating the operation section 14 as a focusing target area, or selects one or more focusing target areas according to a distance measurement mode set by the user.

The specific pixel row determiner 11C determines any of the display target pixel rows (for example, a display target pixel row on the upper end side of the imaging surface 60 in the focusing target area) in the focusing target area selected by the system controller 11 as described above as a specific pixel row 62.

According to this method, after the exposure period, the display of the live view image can be started preferentially from the vicinity of the main subject. Therefore, the risk of losing sight of the main subject can be further reduced.

[Third method] The specific pixel row determiner 11C determines a focusing area of a user on the display surface 23, and determines a display target pixel row corresponding to any of the display pixel rows 23B included in the focusing area as a specific pixel row 62.

For example, the specific pixel row determiner 11C analyzes a face image of a user imaged by a camera installed near the display surface 23 to detect a line of sight of the user, and determines an area shape of a rectangle, a circle, or the like, of which a center is at an intersection of the line of sight and the display surface 23, as the focusing area.

According to this method, after the exposure period, the display of the live view image can be started preferentially from the vicinity of the subject which a user is focusing.

Since a subject that the user is focusing on is often a main subject, this method can further reduce the risk of losing sight of the main subject. Further, since the user does not have to perform special operations, the convenience can be improved.

[Fourth method] A specific pixel row determiner 11C determines any of the display target pixel rows for imaging a subject, among subjects imaged by an imager 5, whose spatial frequency is equal to or higher than a predetermined frequency threshold value as a specific pixel row 62.

For example, the specific pixel row determiner 11C calculates a spatial frequency of a subject being imaged, based on a captured image signal output from the imager 5 immediately before a continuous imaging start instruction is issued.

Then, the specific pixel row determiner 11C determines, for example, a pixel row 62 closest to the upper end of the imaging surface 60 as the specific pixel row 62, among display target pixel rows for imaging a subject whose spatial frequency is equal to or higher than the frequency threshold value.

According to this method, after the exposure period, the display of the live view image can be started preferentially from the vicinity of the subject that has a high spatial frequency.

Subject with high spatial frequency is likely to be a main subject. Therefore, according to this method, the risk of losing sight of the main subject can be further reduced. Further, since the user does not have to perform special operations, the convenience can be improved.

Figure 10:
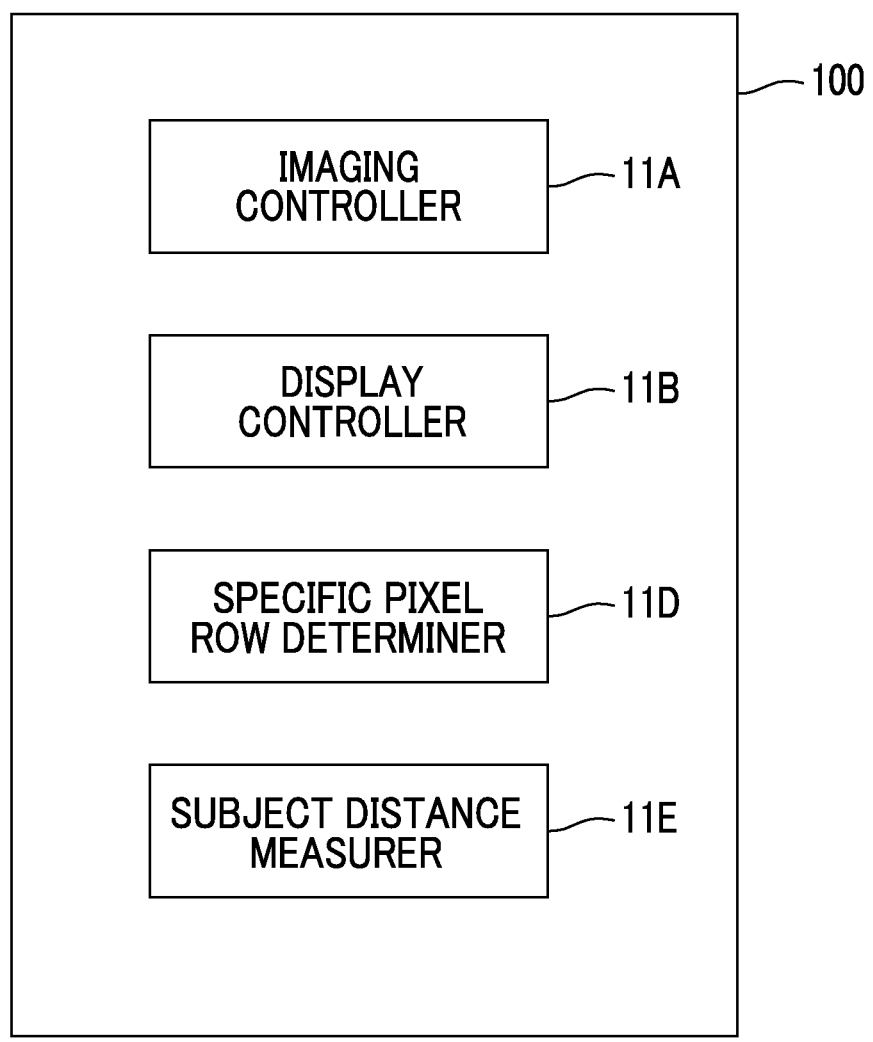
FIG. 10 is a diagram illustrating a modification example of the functional block of the digital camera 100 illustrated in FIG. 1.

FIG. 10 is a diagram illustrating a modification example of the functional block of the digital camera 100 illustrated in FIG. 1. In FIG. 10, same configuration as in FIG. 6 will be denoted with same reference numerals, and a description thereof will be omitted. A hardware configuration of the digital camera 100 illustrated in FIG. 10 is the same as that of FIG. 1, and a description thereof will be omitted.

The digital camera 100 illustrated in FIG. 10 comprises an imaging controller 11A, a display controller 11B, a specific pixel row determiner 11D, and subject distance measurer 11E, as functional blocks.

The system controller 11 functions as an imaging controller 11A, a display controller 11B, a specific pixel row determiner 11D, and a subject distance measurer 11E, by executing a program including an imaging program.

The subject distance measurer 11E uses a laser light source for emitting a laser beam toward a subject provided in vicinity of the imaging optical system, and a detection element for detecting a reflected light of the light emitted from the laser light source. Based on information of the reflected light, a distance between the subject being imaged by the imager 5 and the imaging optical system is measured.

If the imager 5 includes a phase difference detection pixel as the pixel 61, it is also possible to measure the distance between the subject being imaged and the imaging optical system, based on a phase difference detected by the phase difference detection pixel.

The specific pixel row determiner 11D specifies a subject whose difference of a subject distance obtained from a focal position (a position of principal point of a focus lens) of imaging optical system with a distance measured by the subject distance measurer 11E is less than a predetermined distance difference threshold value, among subjects imaged by the imager 5, and determines any of the display target pixel rows for imaging the subject as the specific pixel row 62.

According to this method, after the exposure period, the display of the live view image can be started from the vicinity of the subject that has a high probability of being in focus. Therefore, the risk of losing sight of the main subject can be further reduced. Further, since the user does not have to perform special operations, the convenience can be improved.

Figure 11:
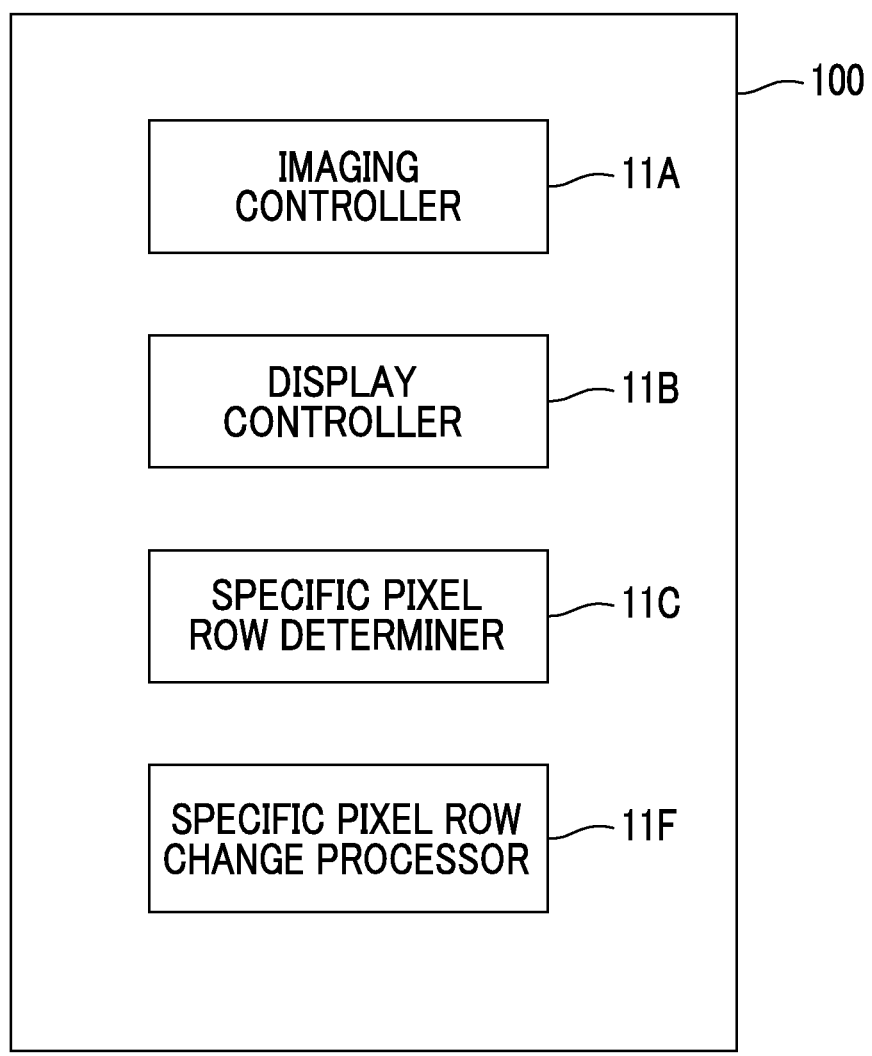
FIG. 11 is a diagram illustrating a modification example of the functional block of the digital camera 100 illustrated in FIG. 1.

FIG. 11 is a diagram illustrating a modification example of the functional block of the digital camera 100 illustrated in FIG. 1. In FIG. 11, same configuration as in FIG. 9 will be denoted with same reference numerals, and a description thereof will be omitted. A hardware configuration of the digital camera 100 illustrated in FIG. 11 is the same as that of FIG. 1, and a description thereof will be omitted.

The digital camera 100 illustrated in FIG. 11 comprises an imaging controller 11A, a display controller 11B, a specific pixel row determiner 11C, and specific pixel row change processor 11F, as functional blocks.

The system controller 11 functions as an imaging controller 11A, a display controller 11B, a specific pixel row determiner 11C, and specific pixel row change processor 11F, by executing a program including an imaging program.

The specific pixel row change processor 11F divides an imaging surface 60 into blocks in the column direction Y, and predicts movement of a specific subject imaged by a block including a specific pixel row 62 determined by the specific pixel row determiner 11C among subjects imaged by the imager 5.

Further, in a case where the specific pixel row change processor 11F determines that a predicted movement position of the specific subject overlaps a block other than the block including the specific pixel row 62 determined by the specific pixel row determiner 11C, the specific pixel row change processor 11F changes the specific pixel row 62 to a display target pixel row in the block overlapping the movement position.

Figure 12:
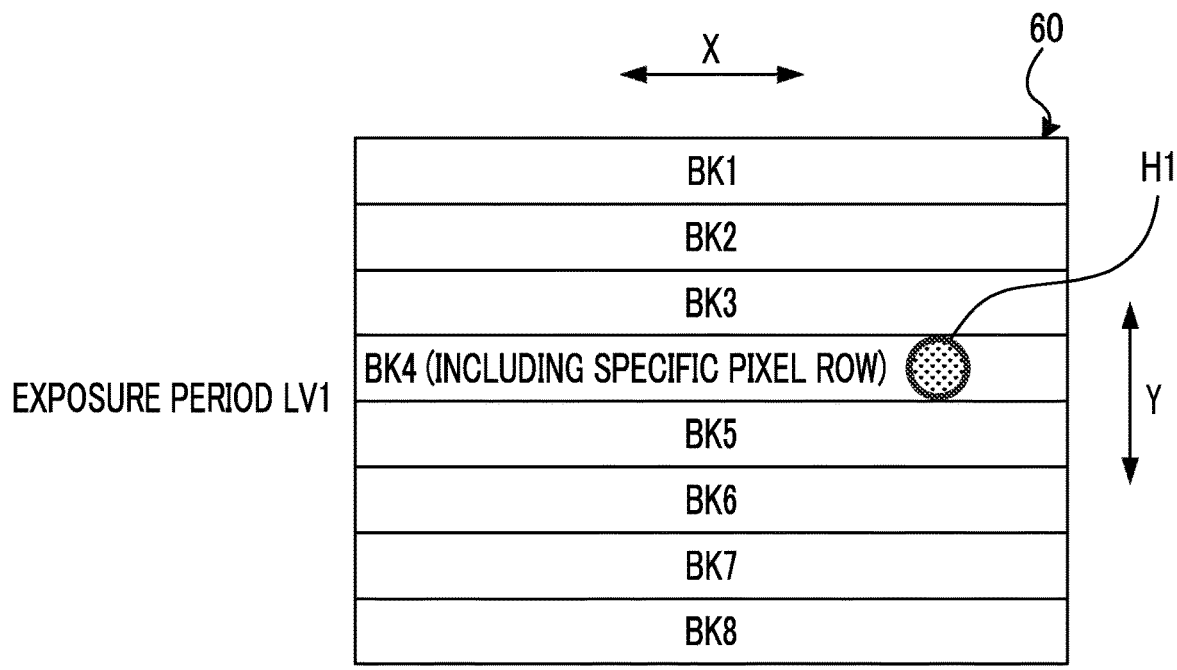
FIG. 12 is a schematic view illustrating an example of a position of a specific subject on the imaging surface 60 during the exposure period LV1 illustrated in FIG. 8.

FIG. 12 is a schematic view illustrating an example of a position of a specific subject on the imaging surface 60 during the exposure period LV1 illustrated in FIG. 8.

Figure 13:
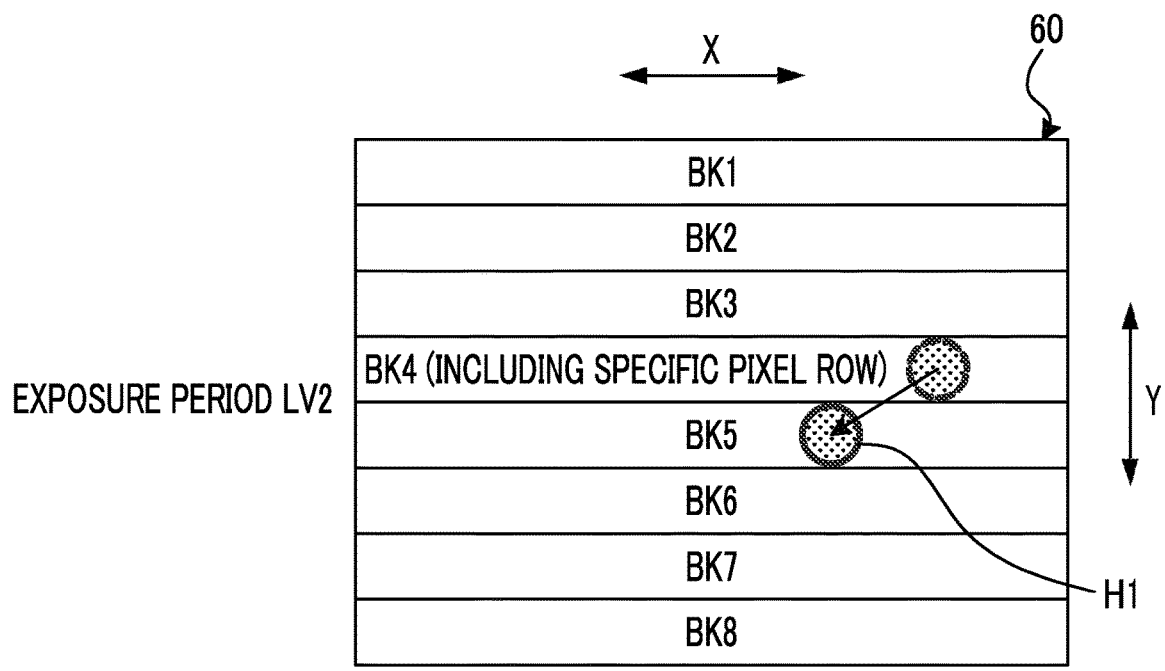
FIG. 13 is a schematic view illustrating an example of a position of a specific subject on the imaging surface 60 during the exposure period LV2 illustrated in FIG. 8.

FIG. 13 is a schematic view illustrating an example of a position of a specific subject on the imaging surface 60 during the exposure period LV2 illustrated in FIG. 8.

Figure 14:
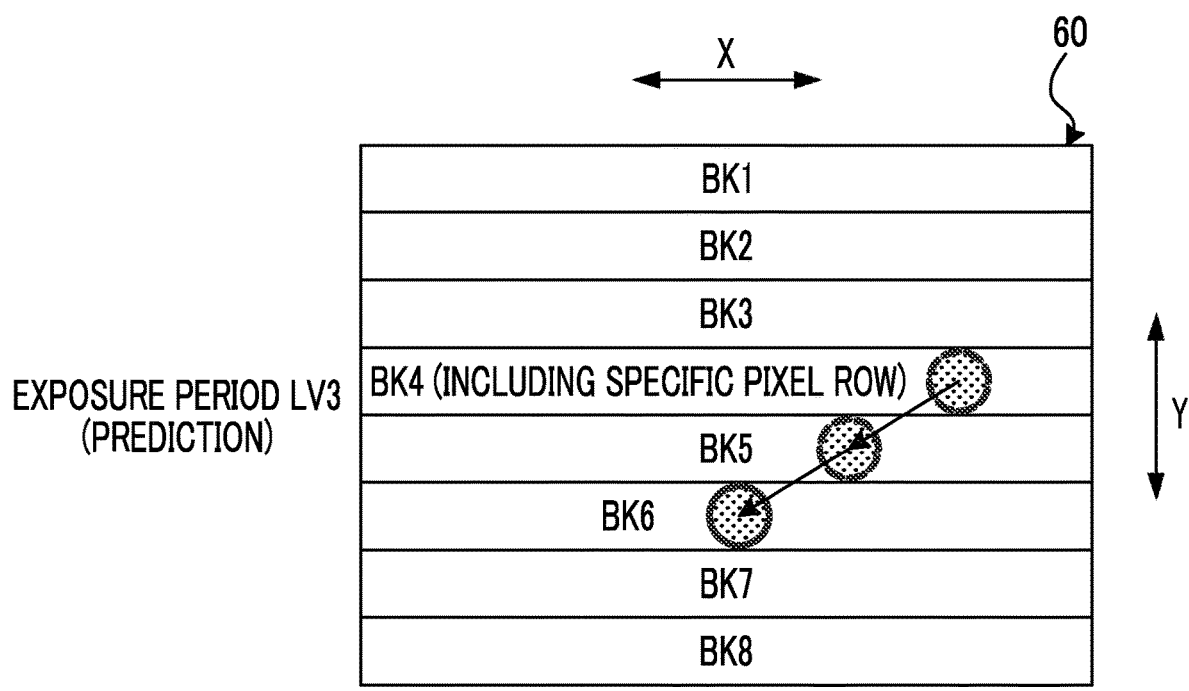
FIG. 14 is a schematic view illustrating an example of a movement position of a specific subject predicted during the exposure period LV3 illustrated in FIG. 8.

FIG. 14 is a schematic view illustrating an example of a movement position of a specific subject predicted during the exposure period LV3 illustrated in FIG. 8.

In FIG. 12, any one of the display target pixel rows included in the block BK4 is determined as a specific pixel row 62, and a state in which a specific subject H1 is imaged by the block BK4 is illustrated.

In FIG. 13, as a result of start of subsequent exposure period LV2 from the state illustrated in FIG. 12, a state in which the position of the specific subject H1 has moved to the position overlapping with the block BK5 is illustrated.

The specific pixel row change processor 11F extracts the specific subject H1 from the captured image signal obtained by a first rolling readout drive immediately after the exposure period LV1, and determines where the specific subject H1 is in the captured image signal which is obtained by a first rolling readout drive immediately after the exposure period LV2.

Further, in a case where the specific pixel row change processor 11F determines that the specific subject H1 moves by a movement amount equal to or more than a predetermined threshold value between the exposure period LV1 and the exposure period LV2, the specific pixel row change processor 11F predicts a movement position of the specific subject H1 in a subsequent exposure period LV3, based on a movement vector and the movement amount thereof.

In the examples illustrated in FIGS. 12 and 13, it is predicted that the specific subject H1 moves to a position overlapping the block BK6, in the exposure period LV3. In this case, the specific pixel row change processor 11F sets one of the display target pixel rows included in the block BK6 (preferably, a display target pixel row closest to the upper end side of the imaging surface 60) as a specific pixel row 62.

In a case where the specific pixel row 62 is changed in this manner, the display controller 11B adjusts a subsequent falling timing of the next vertical synchronization signal VD, so as an update timing of drawing of the display pixel row 23B corresponding to the changed specific pixel row 62 to be a timing after elapse of the time T1 from the start timing of the first rolling readout drive to be performed after the exposure period LV3.

In addition, in a case where the specific pixel row 62 is changed in this manner, the imaging controller 11A performs readout of the pixel signal from the display target pixel row 62 at the upper end of the block BK6, in the first rolling readout drive performed immediately after the exposure period LV3.

As described above, according to the digital camera 100 illustrated in FIG. 11, the specific pixel row 62 can be dynamically changed by the movement of the subject. Therefore, even in a case where the main subject is largely moved, the display of the live view image can be started from the vicinity of the main subject. Therefore, the risk of losing sight of the subject can be further reduced.

Further, the specific pixel row determiner 10C in the digital camera 100 illustrated in FIG. 11 may be replaced by the specific pixel row determiner 11D illustrated in FIG. 10.

The specific pixel row determiner 10C illustrated in FIG. 9 and the specific pixel row determiner 11D illustrated in FIG. 10 detect the movement of the subject being imaged by the imager 5 before determining the specific pixel row 62, respectively, by the above-described method.

In a case where the amount of the movement is equal to or more than a predetermined movement threshold value, the specific pixel row determiner 10C and the specific pixel row determiner 11D may determine a display target pixel row located on the upper end side of the imaging surface 60 with respect to the specific pixel row 62 determined by the above-described method as a final specific pixel row 62.

Figure 15:
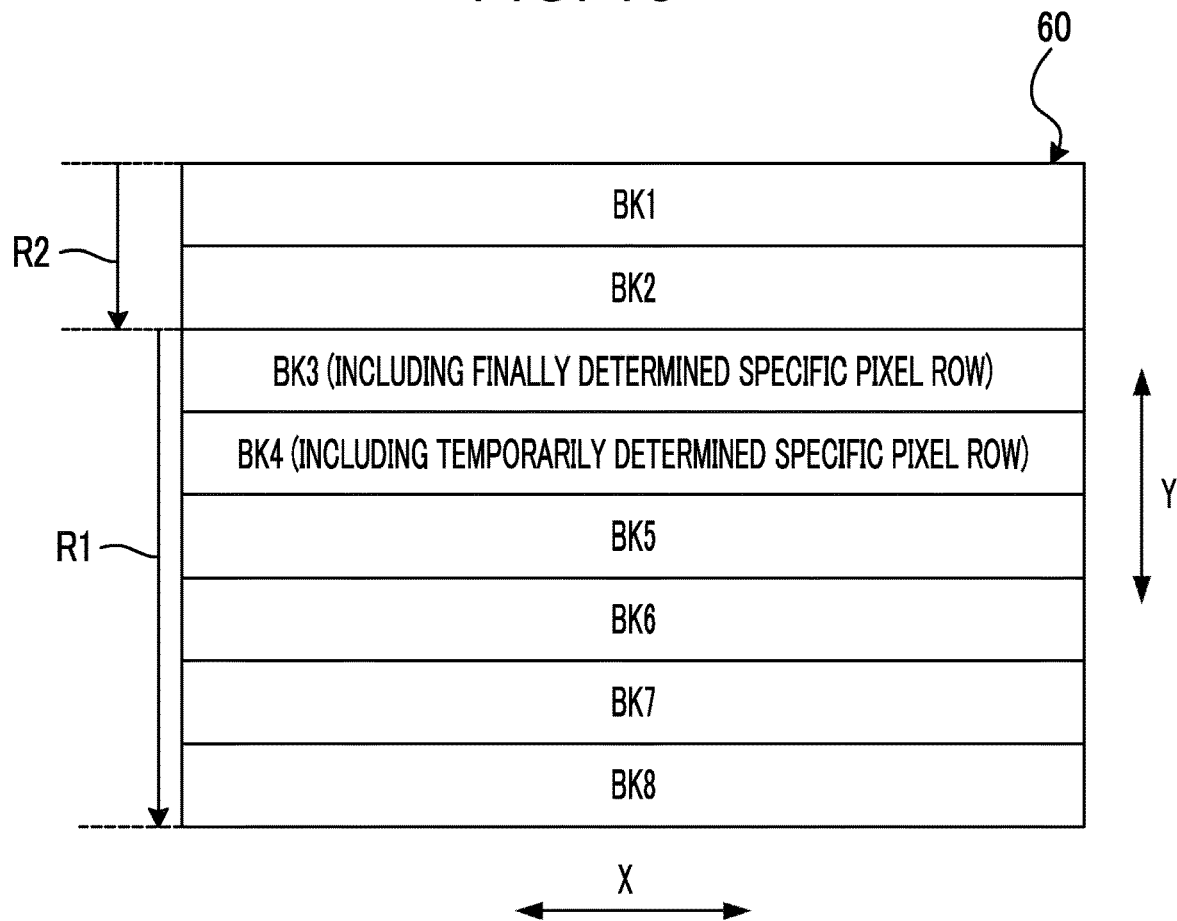
FIG. 15 is a schematic view illustrating a modification example of the method of determining a specific pixel row of the digital camera 100 illustrated in FIG. 1.

For example, in a state that the display target pixel row included in the block BK4 is temporarily determined as the specific pixel row 62, and in a case where the movement of the subject imaged by the imager 5 is equal to or greater than the movement threshold value, the specific pixel row determiner 10C and the specific pixel row determiner 11D finally determine the display target pixel row at the upper end of the block BK3 adjacent to the block BK4 as the specific pixel row 62, as illustrated in FIG. 15.

The movement of the subject being imaged by the imager 5 occurs in the case where a moving object exists within an imaging range and in the case where the entire imaging range is moving due to the shaking of the digital camera 100 or the like.

The specific pixel row determiner 10C and the specific pixel row determiner 11D can detect the movement of the subject by comparing the captured image data based on the captured image signals sequentially output from the imager 5.

According to the above configuration, even in a case where movement of the subject is large and the subject moves toward the upper and lower sides of the temporarily determined specific pixel row 62, a probability that the subject can be confirmed as a live view image immediately after imaging can be increased. Therefore, the risk of losing sight of the subject can be further reduced.

Figure 16:
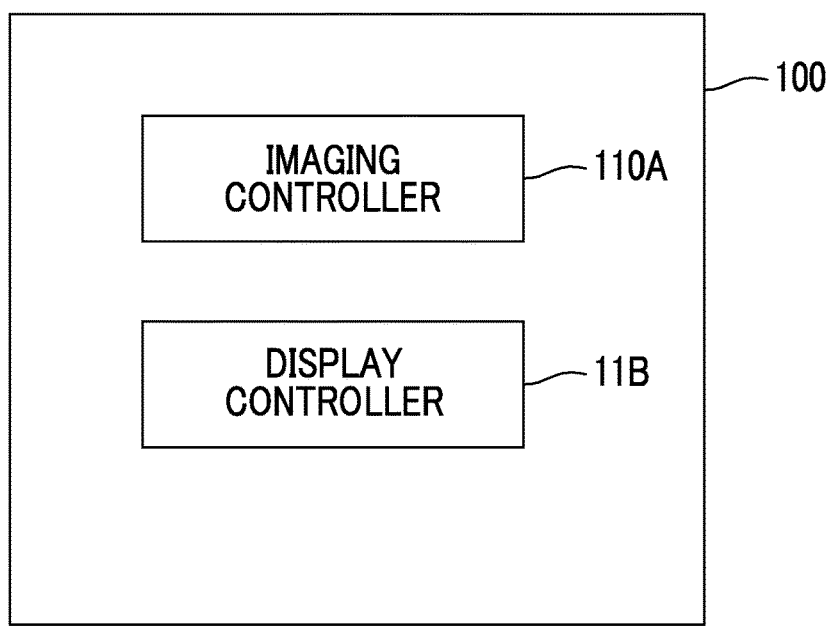
FIG. 16 is a diagram illustrating a modification example of the functional block of the digital camera 100 illustrated in FIG. 1.

FIG. 16 is a diagram illustrating a modification example of the functional block of the digital camera 100 illustrated in FIG. 1. In FIG. 16, same configuration as in FIG. 6 will be denoted with same reference numerals, and a description thereof will be omitted. A hardware configuration of the digital camera 100 illustrated in FIG. 16 is the same as that of FIG. 1, and a description thereof will be omitted.

The digital camera 100 illustrated in FIG. 16 comprises an imaging controller 110A and a display controller 11B, as functional blocks.

The system controller 11 functions as the imaging controller 110A and the display controller 11B, by executing a program including an imaging program.

The imaging controller 110A performs a first set consist of a global reset drive, a global shutter drive, and a first rolling readout drive, same as the imaging controller 11A.

Further, in addition to the first rolling readout drive, as the above-mentioned rolling readout drive, the imaging controller 110A performs a second rolling readout drive to read out the pixel signals in order from a pixel row 62 at the upper end to a pixel row 62 at the lower end of the imaging surface 60 in the column direction Y, in a state that all the electric charges are held in the electric charge holders 61B.

In other words, the imaging controller 110A performs a second set consist of a global reset drive, a global shutter drive, and a second rolling readout drive, in addition to the function of the imaging controller 11A.

The imaging controller 110A performs one of drive modes of a first drive mode in which the first set described above is continuously performed and the second drive set in which a plurality of sets including the first set described above and the second set described above are continuously performed, to drive the imager 5, as described in FIG. 8.

The imaging controller 110A determines whether to drive the imager 5 in the first drive mode or to drive the imager 5 in the second drive mode, based on a display interval which is an interval of falling timing of the vertical synchronization signal VD determined by a refresh rate of the display device and an imaging interval which is an implementation interval of the above set determined by an imaging frame rate of the imager 5.

Specifically, in a case where the display interval and the imaging interval have the same value, the imaging controller 110A drives the imager 5 in the first drive mode illustrated in FIG. 8.

Further, in a case where the display interval and the imaging interval have different values, the imaging controller 110A drives the imager 5 in the second drive mode.

In the second drive mode, the imaging controller 110A performs one first set between two adjacent falling timings of the vertical synchronization signal VD, and performs the second set at least one or more times between the first sets.

In any one second set of at least one or more second sets performed between the first sets of the second drive modes, the imaging controller 110A starts vertical synchronization of the second rolling readout drive, at a timing that is a predetermined time T2 before the falling timing (drawing update timing) of the vertical synchronization signal VD.

The time T2 is a time required from reading out of pixel signals from the display target pixel row 62 located on the uppermost end side of the imaging surface 60 to be started by the second rolling readout drive and line data to be generated from the pixel signal, to the generated line data to be received by the display device controller 22.

Further, the imaging controller 110A determines the implementation ratio between the first set and the second set (the number of times of the second set performed between the first sets) in the case of driving the imager 5 in the second drive mode, based on a ratio of the imaging interval to the display interval.

Specifically, in a case where a value obtained by dividing the display interval by the imaging interval is N, the imaging controller 110A performs the first set once in every N times, and performs the second set (N−1) times, between the first sets.

Figure 17:
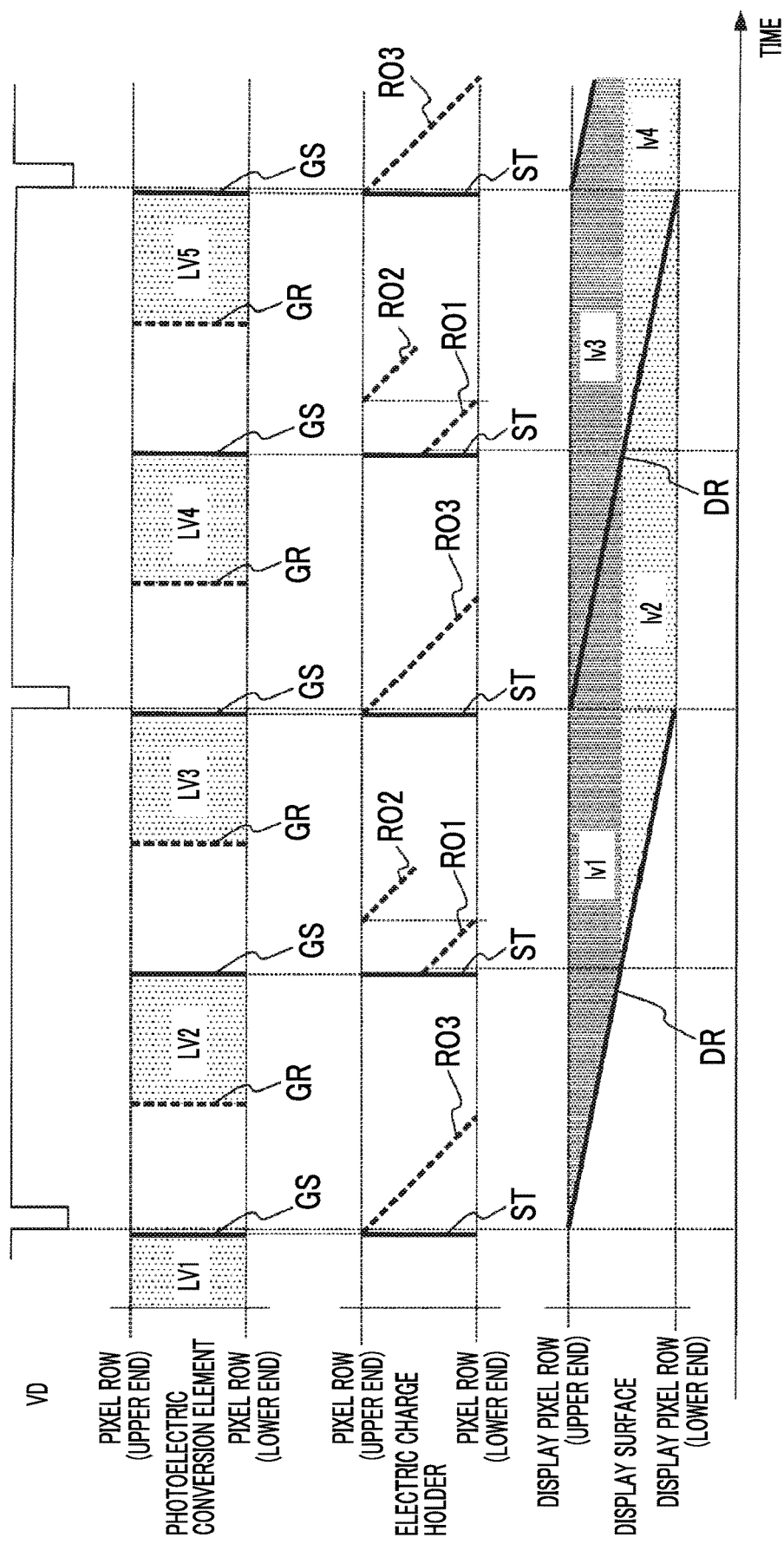
FIG. 17 is a timing chart illustrating operations in a continuous imaging mode of the digital camera 100 illustrated in FIG. 16.

FIG. 17 is a timing chart illustrating operations in a continuous imaging mode of the digital camera 100 illustrated in FIG. 16. FIG. 17 illustrates an example where the ratio of the display interval to the imaging interval is 2:1 (N=2), and illustrates an example where the imaging controller 110A drives the imager 5 in the second drive mode.

Straight lines GS, GR, ST, RO1, RO2, and DR illustrated in FIG. 17 indicate timings as described in FIG. 8. A straight line RO3 illustrated in FIG. 17 indicates timing at which the pixel signal is read out by the second rolling readout drive.

The imaging controller 110A starts the second set slightly before the rise of the vertical synchronization signal VD. That is, the imaging controller 110A performs the global reset drive indicated by the straight line GR, then performs the global shutter drive indicated by the straight line GS, and then performs the second rolling readout drive indicated by the straight line RO3.

When the second rolling readout drive is started, pixel signals obtained in the exposure period LV1 are read out sequentially from the pixel row 62 at the upper end of the imaging surface 60, line data is generated based on the pixel signals, and the line data is input to the display device controller 22.

A time between the start timing of the second rolling readout drive and the start timing of the drawing update process is the time T2. Therefore, an image based on line data obtained by the second rolling readout drive is immediately drawn on the display pixel row 23B.

When the second rolling readout drive is finished, the imaging controller 110A starts the first set. That is, the imaging controller 110A performs the global reset drive indicated by the straight line GR, then performs the global shutter drive indicated by the straight line GS, and then performs the first rolling readout drive indicated by the straight lines RO1 and RO2.

When the first rolling readout drive is started, pixel signals obtained in the exposure period LV2 are read out sequentially from the specific pixel row 62 of the imaging surface 60, line data is generated based on the pixel signals, and the line data is input to the display device controller 22.

A time between the start timing of the first rolling readout drive and the update timing of drawing of the specific pixel row 62 is the time T1. Therefore, an image based on line data obtained by the first rolling readout drive is immediately drawn on the display pixel row 23B.

When the first rolling readout drive is finished, the imaging controller 110A starts the second set. Thereafter, same operation is repeated.

As described above, according to the digital camera 100 illustrated in FIG. 16, even in a case where a refresh rate of the display device and an imaging frame rate are different, live view images are configured to of a combination of images obtained by two times of imaging consecutively performed.

Therefore, it is possible to reduce display delay of the live view image and to reduce the risk of losing sight of the subject.

Figure 18:
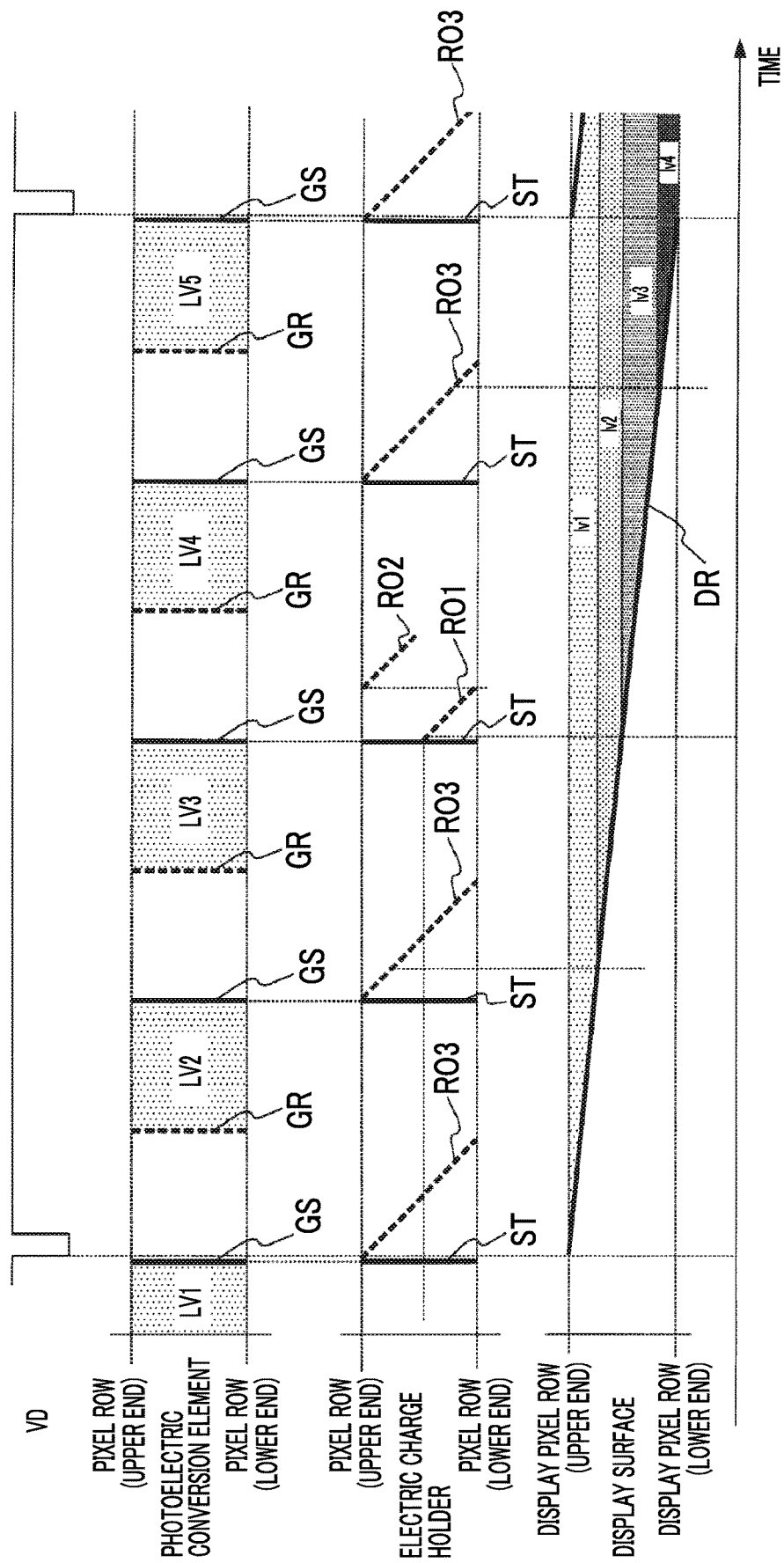
FIG. 18 is a timing chart illustrating other operations in the continuous imaging mode of the digital camera 100 illustrated in FIG. 16.

FIG. 18 is a timing chart illustrating operations in the continuous imaging mode of the digital camera 100 illustrated in FIG. 16. FIG. 18 illustrates an example where the ratio of the display interval to the imaging interval is 4:1 (N=4), and illustrates an example where the imaging controller 110A drives the imager 5 in the second drive mode.

Straight lines GS, GR, ST, RO1, RO2, RO3, and DR illustrated in FIG. 18 indicate timings as described in FIG. 17.

The imaging controller 110A starts the second set slightly before the rise of the vertical synchronization signal VD. That is, the imaging controller 110A performs the global reset drive indicated by the straight line GR, then performs the global shutter drive indicated by the straight line GS, and then performs the second rolling readout drive indicated by the straight line RO3.

When the second rolling readout drive is started, pixel signals obtained in the exposure period LV1 are read out sequentially from the pixel row 62 at the upper end of the imaging surface 60, line data is generated based on the pixel signals, and the line data is input to the display device controller 22. Then, an image based on the line data is immediately drawn on the display pixel row 23B ("lv1" in FIG. 18).

When the second rolling readout drive is finished, the imaging controller 110A starts the second set again. That is, the imaging controller 110A performs the global reset drive indicated by the straight line GR, then performs the global shutter drive indicated by the straight line GS, and then performs the second rolling readout drive indicated by the straight line RO3.

When the second rolling readout drive is started, pixel signals obtained in the exposure period LV2 are read out sequentially from the pixel row 62 at the upper end of the imaging surface 60, line data is generated based on the pixel signals, and the line data is input to the display device controller 22.

Then, when line data corresponding to the display pixel row 23B whose display has not yet updated is generated, an image based on the line data is immediately drawn on the display pixel row 23B ("lv2" in FIG. 18).

When the second rolling readout drive is finished, the imaging controller 110A starts the first set. That is, the imaging controller 110A performs the global reset drive indicated by the straight line GR, then performs the global shutter drive indicated by the straight line GS, and then performs the first rolling readout drive indicated by the straight lines RO1 and RO2.

When the first rolling readout drive is started, pixel signals obtained in the exposure period LV3 are read out sequentially from the specific pixel row 62 of the imaging surface 60, line data is generated based on the pixel signals, and the line data is input to the display device controller 22.

Then, an image based on the line data is immediately drawn on the display pixel row 23B ("lv3" in FIG. 18).

When the first rolling readout drive is finished, the imaging controller 110A starts the second set. When line data corresponding to display pixel row 23B whose display has not been updated yet is generated, among line data generated based on pixel signals read out by the second rolling readout drive of the second set, an image based on the line data is drawn on the display pixel row 23B ("lv4" in FIG. 18).

Thereafter, the processing up to this point (second set→second set→first set→second set) is repeated.

As described above, according to the digital camera 100 illustrated in FIG. 16, even in a case where a refresh rate of the display device and an imaging frame rate are different, live view images are configured to a combination of images obtained by a plurality of times of imaging consecutively performed. Therefore, it is possible to reduce display delay of the live view image and to reduce the risk of losing sight of the subject.

Hereinafter, a configuration of a smartphone will be described as an embodiment of an imaging apparatus of the present invention.

Figure 19:
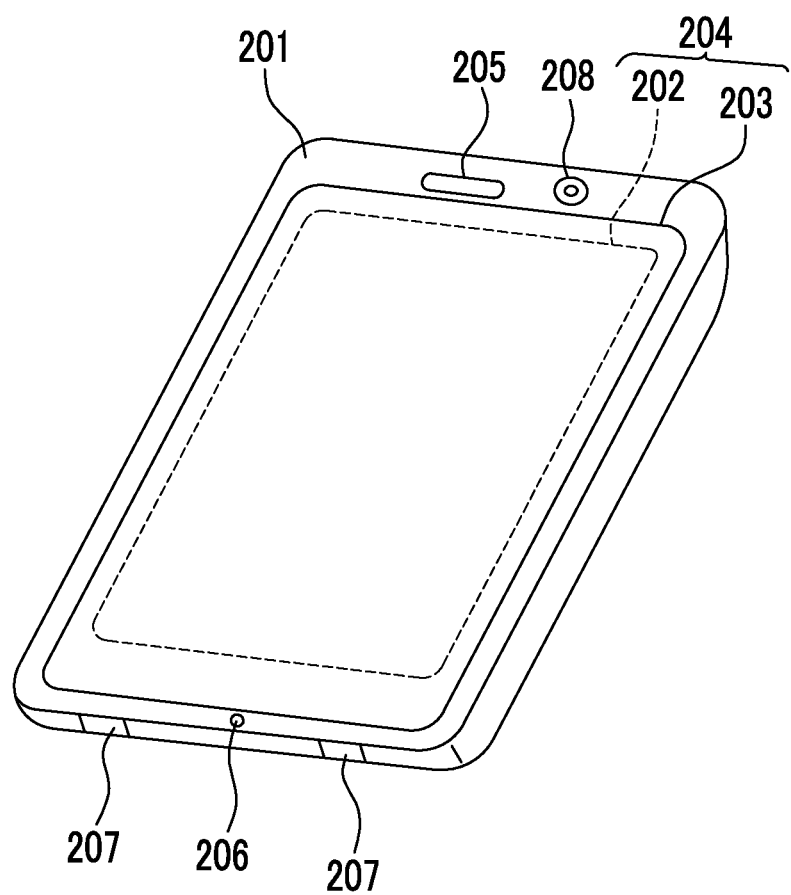
FIG. 19 is a diagram illustrating an appearance of a smartphone 200 which is an embodiment of an imaging apparatus of the present invention.

FIG. 19 is a diagram illustrating an appearance of a smartphone 200 which is an embodiment of an imaging apparatus of the present invention.

The smartphone 200 illustrated in FIG. 19 comprises a housing 201 that has a flat plate shape, and a display input section 204 into which a display panel 202 as a display surface and an operation panel 203 as an input section are integrated on one side of the housing 201.

Further, the housing 201 comprises a speaker 205, a microphone 206, operation sections 207, and a camera section 208. It should be noted that the configuration of the housing 201 is not limited to this. For example, it may be possible to adopt a configuration in which the display surface and the input section are independent, or it may be possible to adopt a configuration having a folded structure or a slide mechanism.

Figure 20:
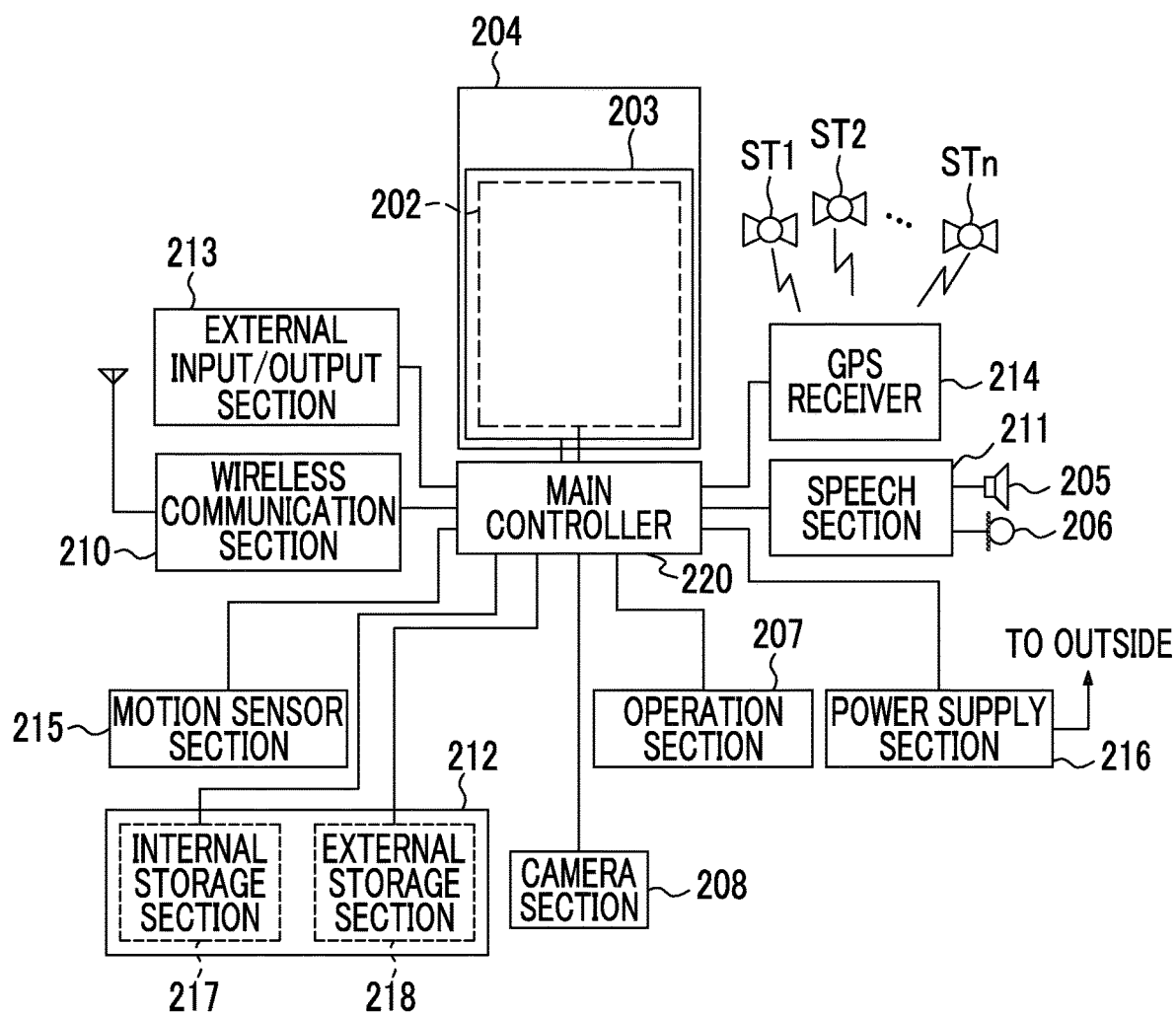
FIG. 20 is a block diagram illustrating a configuration of the smartphone 200 illustrated in FIG. 19.

FIG. 20 is a block diagram illustrating a configuration of the smartphone 200 illustrated in FIG. 19.

As illustrated in FIG. 20, the smartphone comprises, as main components, a wireless communication section 210, a display input section 204, a speech section 211, the operation sections 207, the camera section 208, a storage section 212, an external input/output section 213, a global positioning system (GPS) receiver 214, a motion sensor section 215, a power supply section 216, and a main controller 220.

As the main function of the smartphone 200, there is provided a wireless communication function for performing mobile wireless communication with a base station device BS, which is not shown, through a mobile communication network NW which is not shown.

The wireless communication section 210 performs wireless communication with the base station device BS, which is included in the mobile communication network NW, in accordance with an instruction of the main controller 220. The wireless communication is used to transmit and receive various kinds of file data such as audio data and image data, and e-mail data or to receive web data, streaming data, or the like.

The display input section 204 is a so-called touch panel, that displays an image (still image and moving image), character information, or the like to visually transfer information to the user and detects user operation regard to the displayed information under the control of the main controller 220, and comprises a display panel 202 and an operation panel 203.

The display panel 202 uses a liquid crystal display (LCD), an organic electro-luminescence display (OELD), or the like as a display device.

The operation panel 203 is a device that is placed for viewing an image which is displayed on a display surface of the display panel 202 and that detects a single pair of coordinates or a plurality of pairs of coordinates at which an operation is performed by a user's finger or a stylus. In a case where such a device is operated by a user's finger or a stylus, the device outputs a detection signal, which is generated due to the operation, to the main controller 220. Subsequently, the main controller 220 detects an operation position (coordinates) on the display panel 202, on the basis of the received detection signal.

As illustrated in FIG. 20, the display panel 202 and the operation panel 203 of the smartphone 200, which is exemplified as an imaging apparatus according to the above-mentioned embodiment of the present invention, are integrated to constitute the display input section 204, and are disposed such that the operation panel 203 completely covers the display panel 202.

In a case where such an arrangement is adopted, the operation panel 203 may have a function of detecting a user operation also in an area other than the display panel 202. In other words, the operation panel 203 may comprise a detection area (hereinafter, referred to as a display area) for a part which overlaps with the display panel 202 and a detection area (hereinafter, referred to as a non-display area) for the other part at the outer edge which does not overlap with the display panel 202.

It should be noted that a size of the display area and a size of the display panel 202 may completely coincide with each other, but it is not always necessary for both to coincide with each other. Further, the operation panel 203 may comprise two sensing areas of the outer edge part and the other inside part. A width of the outer edge part is appropriately designed depending on a size of the housing 201 and the like.

In addition, examples of the position detection method adopted for the operation panel 203 may include a matrix switch method, a resistance film method, a surface elastic wave method, an infrared method, an electromagnetic induction method, an electrostatic capacitance method, and the like, and any method may be adopted.

The speech section 211 comprises a speaker 205 or a microphone 206. The speech section 211 converts a sound of a user, which is input through the microphone 206, into sound data, which can be processed in the main controller 220, and outputs the data to the main controller 220, or decodes sound data, which is received by the wireless communication section 210 or the external input/output section 213, and outputs the data from the speaker 205.

Further, as illustrated in FIG. 19, for example, the speaker 205 can be mounted on the same surface as the surface on which the display input section 204 is provided. In addition, the microphone 206 can be mounted on a side surface of the housing 201.

The operation section 207 is a hardware key using a key switch or the like, and receives an instruction from a user. For example, as illustrated in FIG. 19, the operation sections 207 are button type switches which are mounted on the side surface of the housing 201 of the smartphone 200. Each switch is turned on in a case where it is pressed by a finger or the like, and is turned off due to restoring force of a spring in a case where the finger is released.

The storage section 212 stores a control program or control data of the main controller 220, application software, address data in which names, phone numbers, or the like of communication partners are associated, received and transmitted e-mail data, web data which is downloaded by web browsing, or downloaded contents data, and temporarily stores streaming data and the like. Further, the storage section 212 is constituted of an internal storage section 217, which is built into the smartphone, and a removable external storage section 218 which has an external memory slot.

Note that the internal storage section 217 and the external storage section 218 that constitute the storage section 212 is realized using a storage medium such as memory of a flash memory type, a hard disk type, a multimedia card micro type, or a card type (for example, MicroSD (registered trademark) memory or the like), a random access memory (RAM), a read only memory (ROM) or the like.

The external input/output section 213 has a function of an interface with all external devices connected to the smartphone 200. The external input/output section 213 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 200 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, an earphone which is connected in a wired or wireless manner, and the like.

The external input/output section 213 transmits the data received from such an external device to each component inside the smartphone 200, or transmits the data inside the smartphone 200 to the external device.

The GPS receiver 214 receives a plurality of GPS signals, which are transmitted from GPS satellites ST1 to STn, in accordance with instructions of the main controller 220, executes positioning calculation processing on the basis of the received GPS signals, and detects a position formed of a latitude, a longitude, and an altitude of the smartphone 200. The GPS receiver 214 may detect the position by using position information in a case where it is possible to acquire the position information from the wireless communication section 210 or the external input/output section 213 (for example, wireless LAN).

The motion sensor section 215 includes, for example, a triaxial acceleration sensor, and detects physical movement of the smartphone 200, in accordance with an instruction of the main controller 220. By detecting physical movement of the smartphone 200, an acceleration or a direction of the movement of the smartphone 200 is detected. Such a detection result is output to the main controller 220.

The power supply section 216 supplies the respective sections of the smartphone 200 with electric power, which is stored in a battery (not shown), in accordance with an instruction of the main controller 220.

The main controller 220 includes a micro processor, and integrally controls the respective sections of the smartphone 200 by performing an operation on the basis of control data or a control program stored in the storage section 212.

Further, the main controller 220 has a mobile communication control function and an application processing function of controlling the respective sections of a communication system in order to perform data communication or sound communication through the wireless communication section 210.

The application processing function is implemented by an operation of the main controller 220 using application software stored in the storage section 212. Examples of the application processing function include an infrared communication function of performing data communication with opposing devices by controlling the external input/output section 213, an e-mail function of transmitting and receiving e-mails, a web browsing function of browsing web pages, and the like.

Further, the main controller 220 has an image processing function of displaying a video on the display input section 204 and the like, on the basis of image data (still image and moving image data) such as received data or downloaded streaming data.

The image processing function means a function of causing the main controller 220 to decode the image data, apply image processing to the decoding result, and display an image on the display input section 204.

Further, the main controller 220 executes display control for the display panel 202 and operation detection control for detecting a user operation through the operation section 207 and the operation panel 203.

Through execution of the display control, the main controller 220 displays a software key such as an icon for activating application software or a scroll bar, or displays a window for creating an e-mail.

In addition, the scroll bar means a software key for receiving an instruction to move a display portion of an image on a large image which cannot be entirely shown in the display area of the display panel 202.

Further, through execution of the operation detection control, the main controller 220 detects the user operation performed through the operation section 207, receives an operation performed on the icon or a text input performed in an input field of the window through the operation panel 203, or receives a request to scroll a displayed image through the scroll bar.

Furthermore, the main controller 220 has a touch panel control function performed through execution of the operation detection control. The function determines whether the operation position of the operation panel 203 is in the overlapping part (display area) which overlaps with the display panel 202 or the other part (non-display area) at the outer edge which does not overlap with the display panel 202, and controls the display position of the software key or the sensing area of the operation panel 203.

In addition, the main controller 220 may detect a gesture operation performed on the operation panel 203, and may execute a preset function in response to the detected gesture operation.

The gesture operation means an operation for drawing a locus with a finger or the like, an operation of specifying a plurality of positions at the same time, or an operation of drawing loci from a plurality of positions to at least one position as a combination of the above-mentioned operations.

The camera section 208 includes configurations other than the external memory controller 20, the storage medium 21, the display device controller 22, the display surface 23, and the operation section 14 in the digital camera 100 illustrated in FIG. 1 or a modification example thereof. Also, the display controller 11B included in the camera section 208 controls the display device controller 22 to display a live view image.

The captured image data, which is generated by the camera section 208, can be stored in the storage section 212, or can be output through the external input/output section 213 or the wireless communication section 210.

In the smartphone 200 illustrated in FIG. 19, the camera section 208 is mounted on the same side as the display input section 204. However, the mounting position of the camera section 208 is not limited to this. The camera section 208 may be mounted on the rear side of the housing 201.

Further, the camera section 208 can be used in various functions of the smartphone 200. For example, an image acquired by the camera section 208 can be displayed on the display panel 202, or the image of the camera section 208 can be used as one of the operation input of the operation panel 203.

Further, in a case where the GPS receiver 214 detects a position, the GPS receiver 214 may detect the position with reference to an image obtained from the camera section 208. Further, with reference to the image acquired from the camera section 208, it may be possible to determine a direction of an optical axis of the camera section 208 of the smartphone 200 or determine a current usage environment, without using the triaxial acceleration sensor or using combination with the triaxial acceleration sensor. Needless to say, the image acquired from the camera section 208 may be used in the application software.

Otherwise, the position information acquired by the GPS receiver 214, the sound information acquired by the microphone 206 (or text information obtained through sound text conversion performed by the main controller or the like), posture information acquired by the motion sensor section 215, and the like may be added to the image data of the still image or the moving image, and the image data may be stored in the storage section 212, or may be output through the external input/output section 213 or the wireless communication section 210.

In the smartphone 200 configured as described above, focus bracket imaging with few failures is possible.

As described above, the following items are disclosed in this specification.

(1)

An imaging apparatus comprising: an imager that has a plurality of pixels including a photoelectric conversion element and an electric charge holder which holds an electric charge transferred from the photoelectric conversion element and from which a pixel signal corresponding to the electric charge is read out by a reading circuit, and has an imaging surface in which a plurality of pixel rows consisting of the plurality of pixels arranged in a row direction is arranged in a column direction orthogonal to the row direction; an imaging controller that performs a global reset drive for starting exposure of the plurality of pixels by simultaneously resetting the photoelectric conversion elements of the plurality of pixels, a global shutter drive for finishing the exposure by simultaneously transferring the electric charge accumulated in the photoelectric conversion element of each of the plurality of pixels by the exposure to the electric charge holder, and a rolling readout drive for sequentially reading out, for each of the pixel rows, a pixel signal corresponding to the electric charge held in the electric charge holder by the global shutter drive; and a display controller that displays a live view image generated based on the pixel signal output from the pixel of the imager by the rolling readout drive, on a display device that has a display surface on which a plurality of display pixel rows each consisting of a plurality of display pixels arranged in one direction is arranged in an orthogonal direction which is orthogonal to the one direction and performs a drawing update process for sequentially updating an image drawn in the display pixel row from the display pixel row at one end of the display surface in the orthogonal direction to the other end in the orthogonal direction, wherein the imaging controller performs, as the rolling readout drive, a first rolling readout drive for performing readout of the pixel signals in order from a specific one of the pixel rows between the pixel rows at both ends of the column direction of the imaging surface to the pixel row at one end in the column direction of the imaging surface and performing readout of the pixel signals in order from the pixel row at other end in the column direction of the imaging surface to the specific one of the pixel rows after reading out the pixel signal from the pixel row at the one end, wherein the display controller performs a start instruction of the drawing update process to the display device, prior to a start timing of the first rolling readout drive based on the start timing, and wherein a drawing update timing, at which the start instruction is performed, is a timing that the update timing of the image drawn in the display pixel row corresponding to the specific one of the pixel rows in the drawing update process started by the start instruction becomes a timing after a predetermined time from the start timing of the first rolling readout drive is elapsed.

(2)

The imaging apparatus according to (1), wherein the imaging controller consecutively performs a plurality of sets of the global reset drive, the global shutter drive, and the rolling readout drive, wherein the plurality of sets includes a first set in which the first rolling readout drive is performed as the rolling readout drive, and a second set in which a second rolling readout drive is performed as the rolling readout drive, and wherein the second rolling readout drive is a drive for reading out the pixel signals in order from the pixel row at the other end of the imaging surface in the column direction to the pixel row at the one end of the imaging surface in the column direction, and wherein the second set includes starting of the second rolling readout drive at a timing that is a predetermined time before the drawing update timing.

(3)

The imaging apparatus according to (2), wherein the imaging controller determines a ratio between the first set and the second set in the plurality of sets, based on a ratio between an implementation interval of the plurality of sets and an interval at which the drawing update process is performed.

(4)

The imaging apparatus according to (3), wherein in a case where a value obtained by dividing the interval at which the drawing update process is performed by the implementation interval is denoted by N, the imaging controller performs the first set once every N times, and performs the second set (N−1) times between the first sets.

(5)

The imaging apparatus according to any one of (1) to (4), further comprising: a specific pixel row determiner that determines the specific one of the pixel rows based on an input signal from an operation section.

(6)

The imaging apparatus according to any one of (1) to (4), further comprising: a specific pixel row determiner that determines any of the pixel rows, included in a focusing target area set in the imaging surface, as the specific one of the pixel rows.

(7)

The imaging apparatus according to any one of (1) to (4), further comprising: a specific pixel row determiner that determines a focusing area of a user in the display surface and determines the pixel row corresponding to any of the display pixel rows included in the focusing area as the specific one of the pixel rows.

(8)

The imaging apparatus according to any one of (1) to (4), further comprising: a subject distance measurer that measures a distance between an imaging optical system disposed in front of the imager and a subject imaged by the imager; and a specific pixel row determiner that determines any of the pixel rows for imaging the subject with which a difference between a subject distance obtained from a focal position of the imaging optical system and the distance measured by the subject distance measurer is less than a predetermined distance difference threshold value, as the specific one of the pixel rows.

(9)

The imaging apparatus according to any one of (1) to (4), further comprising: a specific pixel row determiner that determines any of the pixel rows for imaging a subject whose spatial frequency is equal to or higher than a predetermined frequency threshold value among the subjects imaged by the imager, as the specific one of the pixel rows.

(10)

The imaging apparatus according to any one of (1) to (9), further comprising: a specific pixel row change processor that, in a case where the imaging surface is divided into a plurality of blocks in the column direction, predicts a movement of a specific subject imaged in the block including the specific one of the pixel rows among the subjects imaged by the imager, and that, in a case where it is determined that a predicted movement position of the specific subject overlaps the block other than the block including the specific one of the pixel rows, changes the specific one of the pixel rows to the pixel row in the block overlapped with the movement position.

(11)

The imaging apparatus according to any one of (1) to (9), further comprising: a specific pixel row change processor that detects an amount of movement of a specific subject imaged in the specific one of the pixel rows among the subjects imaged by the imager and in a case where the amount of movement is equal to or greater than a predetermined movement threshold value, change the specific one of the pixel rows to the pixel row positioned on the other end side of the imaging surface in the column direction of the specific one of the pixel rows.

(12)

An imaging method using an imager that has a plurality of pixels including a photoelectric conversion element and an electric charge holder which holds an electric charge transferred from the photoelectric conversion element and from which a pixel signal corresponding to the electric charge is read out by a reading circuit, and has an imaging surface in which a plurality of pixel rows consisting of the plurality of pixels arranged in a row direction is arranged in a column direction orthogonal to the row direction, the method comprising: an imaging control step for performing a global reset drive for starting exposure of the plurality of pixels by simultaneously resetting the photoelectric conversion elements of the plurality of pixels, a global shutter drive for finishing the exposure by simultaneously transferring the electric charge accumulated in the photoelectric conversion element of each of the plurality of pixels by the exposure to the electric charge holder, and a rolling readout drive for sequentially reading out, for each of the pixel rows, a pixel signal corresponding to the electric charge held in the electric charge holder by the global shutter drive; and a display control step for displaying a live view image generated based on the pixel signal output from the pixel of the imager by the rolling readout drive, on a display device that has a display surface on which a plurality of display pixel rows each consisting of a plurality of display pixels arranged in one direction is arranged in an orthogonal direction which is orthogonal to the one direction and performs a drawing update process for sequentially updating an image drawn in the display pixel row from the display pixel row at one end of the display surface in the orthogonal direction to the other end in the orthogonal direction, wherein in the imaging control step, as the rolling readout drive, a first rolling readout drive for performing readout of the pixel signals in order from a specific one of the pixel rows between the pixel rows at both ends of the column direction of the imaging surface to the pixel row at one end in the column direction of the imaging surface and performing readout of the pixel signals in order from the pixel row at other end in the column direction of the imaging surface to the specific one of the pixel rows after reading out the pixel signal from the pixel row at the one end, is performed, wherein in the display control step, a start instruction of the drawing update process for the display device, is performed prior to a start timing of the first rolling readout drive based on the start timing, and wherein a drawing update timing, at which the start instruction is performed, is a timing that the update timing of the image drawn in the display pixel row corresponding to the specific one of the pixel rows in the drawing update process started by the start instruction becomes a timing after a predetermined time from the start timing of the first rolling readout drive is elapsed.

(13)

The imaging method according to (12), wherein in the imaging control step, a plurality of sets of the global reset drive, the global shutter drive, and the rolling readout drive are consecutively performed, wherein the plurality of sets includes a first set in which the first rolling readout drive is performed as the rolling readout drive, and a second set in which a second rolling readout drive is performed as the rolling readout drive, and wherein the second rolling readout drive starts a drive for reading out the pixel signals in order from the pixel row at the other end of the imaging surface in the column direction to the pixel row at the one end of the imaging surface in the column direction, at a timing prior to the predetermined time before the drawing update timing.

(14)

The imaging method according to (13), wherein in the imaging control step, a ratio between the first set and the second set in the plurality of sets, based on a ratio between an implementation interval of the plurality of sets and an interval at which the drawing update process is performed, is determined.

(15)

The imaging method according to (14), wherein in the imaging control step, in a case where a value obtained by dividing the interval at which the drawing update process is performed by the implementation interval is denoted by N, the first set is performed once every N times, and the second set is performed (N−1) times between the first sets.

(16)

The imaging method according to any one of (12) to (15), further comprising: a specific pixel row determination step for determining the specific one of the pixel rows, based on an input signal from an operation section.

(17)

The imaging method according to any one of (12) to (15), further comprising: a specific pixel row determination step for determining any of the pixel rows, included in a focusing target area set in the imaging surface, as the specific one of the pixel rows.

(18)

The imaging method according to any one of (12) to (15), further comprising: a specific pixel row determination step for determining a focusing area of a user in the display surface, and determining the pixel row corresponding to any of the display pixel rows included in the focusing area as the specific one of the pixel rows.

(19)

The imaging method according to any one of (12) to (15), further comprising: a subject distance measuring step for measuring a distance between an imaging optical system disposed in front of the imager and a subject imaged by the imager; and a specific pixel row determination step for determining any of the pixel rows for imaging the subject with which a difference between a subject distance obtained from a focal position of the imaging optical system and the distance measured in the subject distance measuring step is less than a predetermined distance difference threshold value, as the specific one of the pixel rows.

(20)

The imaging method according to any one of (12) to (15), further comprising: a specific pixel row determination step for determining any of the pixel rows for imaging a subject whose spatial frequency is equal to or higher than a predetermined frequency threshold value among the subjects imaged by the imager, as the specific one of the pixel rows.

(21)

The imaging method according to any one of (12) to (20), further comprising: a specific pixel row change processing step for predicting a movement of a specific subject imaged in the block including the specific one of the pixel rows among the subjects imaged by the imager in a case where the imaging surface is divided into a plurality of blocks in the column direction, and in a case where it is determined that a predicted movement position of the specific subject overlaps the block other than the block including the specific one of the pixel rows, to change the specific one of the pixel rows to the pixel row in the block overlapped with the movement position.

(22)

The imaging method according to any one of (12) to (20), further comprising: a specific pixel row change processing step for detecting an amount of movement of a specific subject imaged in the specific one of the pixel rows among the subjects imaged by the imager, and in a case where the amount of movement is equal to or greater than a predetermined movement threshold value, to change the specific one of the pixel rows to the pixel row positioned on the other end side of the imaging surface in the column direction of the specific one of the pixel rows.

(23)

An imaging program that causes a computer to realize an imaging method using an imager that has a plurality of pixels including a photoelectric conversion element and an electric charge holder which holds an electric charge transferred from the photoelectric conversion element and from which a pixel signal corresponding to the electric charge is read out by a reading circuit, and has an imaging surface in which a plurality of pixel rows consisting of the plurality of pixels arranged in a row direction is arranged in a column direction orthogonal to the row direction, the imaging method comprising: an imaging control step for performing a global reset drive for starting exposure of the plurality of pixels by simultaneously resetting the photoelectric conversion elements of the plurality of pixels, a global shutter drive for finishing the exposure by simultaneously transferring the electric charge accumulated in the photoelectric conversion element of each of the plurality of pixels by the exposure to the electric charge holder, and a rolling readout drive for sequentially reading out, for each of the pixel rows, a pixel signal corresponding to the electric charge held in the electric charge holder by the global shutter drive; and a display control step for displaying a live view image generated based on the pixel signal output from the pixel of the imager by the rolling readout drive, on a display device that has a display surface on which a plurality of display pixel rows each consisting of a plurality of display pixels arranged in one direction is arranged in an orthogonal direction which is orthogonal to the one direction and performs a drawing update process for sequentially updating an image drawn in the display pixel row from the display pixel row at one end of the display surface in the orthogonal direction to the other end in the orthogonal direction, wherein in the imaging control step, as the rolling readout drive, a first rolling readout drive for performing readout of the pixel signals in order from a specific one of the pixel rows between the pixel rows at both ends of the column direction of the imaging surface to the pixel row at one end in the column direction of the imaging surface and performing readout of the pixel signals in order from the pixel row at other end in the column direction of the imaging surface to the specific one of the pixel rows after reading out the pixel signal from the pixel row at the one end, is performed, wherein in the display control step, a start instruction of the drawing update process for the display device, is performed prior to a start timing of the first rolling readout drive based on the start timing, and wherein a drawing update timing, at which the start instruction is performed, is a timing that the update timing of the image drawn in the display pixel row corresponding to the specific one of the pixel rows in the drawing update process started by the start instruction becomes a timing after a predetermined time from the start timing of the first rolling readout drive is elapsed.

According to the embodiments of the present invention, it is possible to rapidly display a portion necessary for the user among captured image signals obtained by performing imaging by driving of the global shutter method, to reduce a risk of losing a subject.

Although the present invention has been described with reference to specific embodiments, the present invention is not limited to this embodiment, and various modifications are possible without departing from the technical concept of the disclosed invention.

This application is on the basis of Japanese patent application (Japanese Patent Application No. 2017-056327) filed on Mar. 22, 2017, the content of which is incorporated herein.

EXPLANATION OF REFERENCES

1: imaging lens
2: stop
4: lens controller

5: imager
60: imaging surface
61: pixel
61A: photoelectric conversion element
61B: electric charge holder
61C: electric charge transfer unit
61D: floating diffusion
61E: reading circuit
62: pixel row
63: driving circuit
64: signal processing circuit
65: signal line
70: N-type substrate
71: P well layer
72: reading electrode
73: N-type impurity layer
74: P-type impurity layer
75: area
76: transfer electrode
77: reset transistor
78: output transistor
79: select transistor
8: lens driving section
9: stop driving section
10: imager driving section
11: system controller
11A, 110A: imaging controller
11B: display controller
11C, 11D: specific pixel row determiner
11E: subject distance measurer
11F: specific pixel row change processor
14: operation section
15: memory controller
16: main memory
17: digital signal processing section
20: external memory controller
21: storage medium
22: display device controller
23: display surface
23A: display pixel
23B: display pixel row
24: control bus
25: data bus
40: lens device
R1, R2: readout direction
GS, GR, RO1, RO2, RO3, ST, DR: straight line
H1: specific subject
200: smartphone
201: housing
202: display panel
203: operation panel
204: display input section
205: speaker
206: microphone
207: operation section
208: camera section
210: wireless communication section
211: speech section
212: storage section
213: external input/output section
214: GPS receiver
215: motion sensor section
216: power supply section
217: internal storage section
218: external storage section
220: main controller
ST1 to STn: GPS satellite

What is claimed is:

1. An imaging apparatus comprising:

an imager that comprises a plurality of pixels comprising a photoelectric conversion element and an electric charge holder which holds an electric charge transferred from the photoelectric conversion element and from which a pixel signal corresponding to the electric charge is read out by a reading circuit, and has an imaging surface in which a plurality of pixel rows consisting of the plurality of pixels arranged in a row direction is arranged in a column direction orthogonal to the row direction;

an imaging controller that performs a global reset drive for starting exposure of the plurality of pixels by simultaneously resetting the photoelectric conversion elements of the plurality of pixels, a global shutter drive for finishing the exposure by simultaneously transferring the electric charge accumulated in the photoelectric conversion element of each of the plurality of pixels by the exposure to the electric charge holder, and a rolling readout drive for sequentially reading out, for each of the pixel rows, a pixel signal corresponding to the electric charge held in the electric charge holder by the global shutter drive; and a display controller that displays a live view image generated based on the pixel signal output from the pixel of the imager by the rolling readout drive, on a display device that has a display surface on which a plurality of display pixel rows each consisting of a plurality of display pixels arranged in one direction is arranged in an orthogonal direction which is orthogonal to the one direction and performs a drawing update process for sequentially updating an image drawn in the display pixel row from the display pixel row at one end of the display surface in the orthogonal direction to other end in the orthogonal direction, wherein the imaging controller performs, as the rolling readout drive, a first rolling readout drive for performing readout of the pixel signals in order from a specific one of the pixel rows between the pixel rows at both ends of the column direction of the imaging surface to the pixel row at one end in the column direction of the imaging surface and performing readout of the pixel signals in order from the pixel row at other end in the column direction of the imaging surface to the specific one of the pixel rows after reading out the pixel signal from the pixel row at the one end, wherein the display controller performs a start instruction of the drawing update process to the display device, prior to a start timing of the first rolling readout drive based on the start timing, and wherein a drawing update timing, at which the start instruction is performed, is a timing that the update timing of the image drawn in the display pixel row corresponding to the specific one of the pixel rows in the drawing update process started by the start instruction becomes a timing after a predetermined time from the start timing of the first rolling readout drive is elapsed.

2. The imaging apparatus according to claim 1, wherein the imaging controller consecutively performs a plurality of sets of the global reset drive, the global shutter drive, and the rolling readout drive, wherein the plurality of sets includes a first set in which the first rolling readout drive is performed as the rolling readout drive, and a second set in which a second rolling readout drive is performed as the rolling readout drive, and wherein the second rolling readout drive is a drive for reading out the pixel signals in order from the pixel row at the other end of the imaging surface in the column direction to the pixel row at the one end of the imaging surface in the column direction, and wherein the second set includes starting of the second rolling readout drive at a timing that is a predetermined time before the drawing update timing.

3. The imaging apparatus according to claim 2, wherein the imaging controller determines a ratio between the first set and the second set in the plurality of sets, based on a ratio between an implementation interval of the plurality of sets and an interval at which the drawing update process is performed.

4. The imaging apparatus according to claim 3, wherein in a case where a value obtained by dividing the interval at which the drawing update process is performed by the implementation interval is denoted by N, the imaging controller performs the first set once every N times, and performs the second set (N−1) times between the first sets.

5. The imaging apparatus according to claim 1, further comprising:

a specific pixel row determiner that determines the specific one of the pixel rows based on an input signal from an operation section.

6. The imaging apparatus according to claim 1, further comprising:

a specific pixel row determiner that determines any of the pixel rows, included in a focusing target area set in the imaging surface, as the specific one of the pixel rows.

7. The imaging apparatus according to claim 1, further comprising:

a specific pixel row determiner that determines a focusing area of a user in the display surface and determines the pixel row corresponding to any of the display pixel rows included in the focusing area as the specific one of the pixel rows.

8. The imaging apparatus according to claim 1, further comprising:

a subject distance measurer that measures a distance between an imaging optical system disposed in front of the imager and a subject imaged by the imager; and a specific pixel row determiner that determines any of the pixel rows for imaging the subject with which a difference between a subject distance obtained from a focal position of the imaging optical system and the distance measured by the subject distance measurer is less than a predetermined distance difference threshold value, as the specific one of the pixel rows.

9. The imaging apparatus according to claim 1, further comprising:

a specific pixel row determiner that determines any of the pixel rows for imaging a subject whose spatial frequency is equal to or higher than a predetermined frequency threshold value among the subjects imaged by the imager, as the specific one of the pixel rows.

10. The imaging apparatus according to claim 1, further comprising:

a specific pixel row change processor that, in a case where the imaging surface is divided into a plurality of blocks in the column direction, predicts a movement of a specific subject imaged in the block including the specific one of the pixel rows among the subjects imaged by the imager, and that, in a case where the specific pixel row change processor determines that a predicted movement position of the specific subject overlaps the block other than the block including the specific one of the pixel rows, changes the specific one of the pixel rows to the pixel row in the block overlapped with the movement position.

11. The imaging apparatus according to claim 1, further comprising:

a specific pixel row change processor that detects an amount of movement of a specific subject imaged in the specific one of the pixel rows among the subjects imaged by the imager and in a case where the amount of movement is equal to or greater than a predetermined movement threshold value, change the specific one of the pixel rows to the pixel row positioned on the other end side of the imaging surface in the column direction of the specific one of the pixel rows.

12. An imaging method using an imager that comprises a plurality of pixels comprising a photoelectric conversion element and an electric charge holder which holds an electric charge transferred from the photoelectric conversion element and from which a pixel signal corresponding to the electric charge is read out by a reading circuit, and has an imaging surface in which a plurality of pixel rows consisting of the plurality of pixels arranged in a row direction is arranged in a column direction orthogonal to the row direction, the method comprising:

an imaging control step for performing a global reset drive for starting exposure of the plurality of pixels by simultaneously resetting the photoelectric conversion elements of the plurality of pixels, a global shutter drive for finishing the exposure by simultaneously transferring the electric charge accumulated in the photoelectric conversion element of each of the plurality of pixels by the exposure to the electric charge holder, and a rolling readout drive for sequentially reading out, for each of the pixel rows, a pixel signal corresponding to the electric charge held in the electric charge holder by the global shutter drive; and a display control step for displaying a live view image generated based on the pixel signal output from the pixel of the imager by the rolling readout drive, on a display device that has a display surface on which a plurality of display pixel rows each consisting of a plurality of display pixels arranged in one direction is arranged in an orthogonal direction which is orthogonal to the one direction and performs a drawing update process for sequentially updating an image drawn in the display pixel row from the display pixel row at one end of the display surface in the orthogonal direction to other end in the orthogonal direction, wherein in the imaging control step, as the rolling readout drive, a first rolling readout drive for performing readout of the pixel signals in order from a specific one of the pixel rows between the pixel rows at both ends of the column direction of the imaging surface to the pixel row at one end in the column direction of the imaging surface and performing readout of the pixel signals in order from the pixel row at other end in the column direction of the imaging surface to the specific one of the pixel rows after reading out the pixel signal from the pixel row at the one end, is performed, wherein in the display control step, a start instruction of the drawing update process for the display device, is performed prior to a start timing of the first rolling readout drive based on the start timing, and wherein a drawing update timing, at which the start instruction is performed, is a timing that the update timing of the image drawn in the display pixel row corresponding to the specific one of the pixel rows in the drawing update process started by the start instruction becomes a timing after a predetermined time from the start timing of the first rolling readout drive is elapsed.

13. The imaging method according to claim 12,
wherein in the imaging control step, a plurality of sets of the global reset drive, the global shutter drive, and the rolling readout drive are consecutively performed,
wherein the plurality of sets includes a first set in which the first rolling readout drive is performed as the rolling readout drive, and a second set in which a second rolling readout drive is performed as the rolling readout drive, and
wherein the second rolling readout drive starts a drive for reading out the pixel signals in order from the pixel row at the other end of the imaging surface in the column direction to the pixel row at the one end of the imaging surface in the column direction, at a timing prior to the predetermined time before the drawing update timing.

14. The imaging method according to claim 13,
wherein in the imaging control step, a ratio between the first set and the second set in the plurality of sets, based on a ratio between an implementation interval of the plurality of sets and an interval at which the drawing update process is performed, is determined.

15. The imaging method according to claim 14,
wherein in the imaging control step, in a case where a value obtained by dividing the interval at which the drawing update process is performed by the implementation interval is denoted by N, the first set is performed once every N times, and the second set is performed (N−1) times between the first sets.

16. The imaging method according to claim 12, further comprising:
a specific pixel row determination step for determining the specific one of the pixel rows, based on an input signal from an operation section.

17. The imaging method according to claim 12, further comprising:
a specific pixel row determination step for determining any of the pixel rows, included in a focusing target area set in the imaging surface, as the specific one of the pixel rows.

18. The imaging method according to claim 12, further comprising:
a specific pixel row determination step for determining a focusing area of a user in the display surface, and determining the pixel row corresponding to any of the display pixel rows included in the focusing area as the specific one of the pixel rows.

19. The imaging method according to claim 12, further comprising:
a subject distance measuring step for measuring a distance between an imaging optical system disposed in front of the imager and a subject imaged by the imager; and
a specific pixel row determination step for determining any of the pixel rows for imaging the subject with which a difference between a subject distance obtained from a focal position of the imaging optical system and the distance measured in the subject distance measuring step is less than a predetermined distance difference threshold value, as the specific one of the pixel rows.

20. The imaging method according to claim 12, further comprising:
a specific pixel row determination step for determining any of the pixel rows for imaging a subject whose spatial frequency is equal to or higher than a predetermined frequency threshold value among the subjects imaged by the imager, as the specific one of the pixel rows.

21. The imaging method according to claim 12, further comprising:
a specific pixel row change processing step for predicting a movement of a specific subject imaged in the block including the specific one of the pixel rows among the subjects imaged by the imager in a case where the imaging surface is divided into a plurality of blocks in the column direction, and in a case where it is determined that a predicted movement position of the specific subject overlaps the block other than the block including the specific one of the pixel rows, to change the specific one of the pixel rows to the pixel row in the block overlapped with the movement position.

22. The imaging method according to claim 12, further comprising:
a specific pixel row change processing step for detecting an amount of movement of a specific subject imaged in the specific one of the pixel rows among the subjects imaged by the imager, and in a case where the amount of movement is equal to or greater than a predetermined movement threshold value, to change the specific one of the pixel rows to the pixel row positioned on the other end side of the imaging surface in the column direction of the specific one of the pixel rows.

23. A non-transitory computer readable medium storing an imaging program that causes a computer to realize an imaging method using an imager that comprises a plurality of pixels comprising a photoelectric conversion element and an electric charge holder which holds an electric charge transferred from the photoelectric conversion element and from which a pixel signal corresponding to the electric charge is read out by a reading circuit, and has an imaging surface in which a plurality of pixel rows consisting of the plurality of pixels arranged in a row direction is arranged in a column direction orthogonal to the row direction, the imaging method comprising:
an imaging control step for performing a global reset drive for starting exposure of the plurality of pixels by simultaneously resetting the photoelectric conversion elements of the plurality of pixels, a global shutter drive for finishing the exposure by simultaneously transferring the electric charge accumulated in the photoelectric conversion element of each of the plurality of pixels by the exposure to the electric charge holder, and a rolling readout drive for sequentially reading out, for each of the pixel rows, a pixel signal corresponding to the electric charge held in the electric charge holder by the global shutter drive; and
a display control step for displaying a live view image generated based on the pixel signal output from the pixel of the imager by the rolling readout drive, on a display device that has a display surface on which a plurality of display pixel rows each consisting of a plurality of display pixels arranged in one direction is arranged in an orthogonal direction which is orthogonal to the one direction and performs a drawing update process for sequentially updating an image drawn in the display pixel row from the display pixel row at one end of the display surface in the orthogonal direction to other end in the orthogonal direction, wherein in the imaging control step, as the rolling readout drive, a first rolling readout drive for performing readout of the pixel signals in order from a specific one of the pixel rows between the pixel rows at both ends of the column direction of the imaging surface to the pixel row at one end in the column direction of the imaging surface and performing readout of the pixel signals in order from the pixel row at other end in the column direction of the imaging surface to the specific one of the pixel rows after reading out the pixel signal from the pixel row at the one end, is performed, wherein in the display control step, a start instruction of the drawing update process for the display device, is performed prior to a start timing of the first rolling readout drive based on the start timing, and wherein a drawing update timing, at which the start instruction is performed, is a timing that the update timing of the image drawn in the display pixel row corresponding to the specific one of the pixel rows in the drawing update process started by the start instruction becomes a timing after a predetermined time from the start timing of the first rolling readout drive is elapsed.

* * * * *